US012781980B2

(12) United States Patent
Kim et al.

(10) Patent No.: US 12,781,980 B2
(45) Date of Patent: Nov. 3, 2026

(54) HUMIDIFIER

(71) Applicant: LG ELECTRONICS INC., Seoul (KR)

(72) Inventors: Yongmin Kim, Seoul (KR); Jaeheuk Choi, Seoul (KR); Dongryul Park, Seoul (KR); Chiyoung Choi, Seoul (KR); Jeonghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 396 days.

(21) Appl. No.: 18/539,639

(22) Filed: Dec. 14, 2023

(65) Prior Publication Data

US 2024/0200798 A1 Jun. 20, 2024

(30) Foreign Application Priority Data

Dec. 19, 2022 (KR) ........................ 10-2022-0177806

(51) Int. Cl.

| | |
|---|---|
| ***F24F 6/02*** | (2006.01) |
| ***B01F 23/21*** | (2022.01) |
| ***B01F 23/213*** | (2022.01) |
| ***F24F 1/0087*** | (2019.01) |
| ***F24F 6/12*** | (2006.01) |
| ***F24F 13/20*** | (2006.01) |
| *F24F 6/00* | (2006.01) |

(52) U.S. Cl.

CPC ............ *F24F 6/02* (2013.01); *B01F 23/2133* (2022.01); *F24F 1/0087* (2019.02); *F24F 6/12* (2013.01); *F24F 13/20* (2013.01); *F24F 2006/008* (2013.01)

(58) Field of Classification Search

CPC ..... F24F 6/02; F24F 6/12; B01F 23/21; B01F 23/2133

See application file for complete search history.

(56) References Cited

U.S. PATENT DOCUMENTS

| | | | |
|---|---|---|---|
| 6,244,576 | B1 | 6/2001 | Tsai |
| 2021/0222895 | A1 | 7/2021 | Bae et al. |

FOREIGN PATENT DOCUMENTS

| | | | | | |
|---|---|---|---|---|---|
| CN | 108105926 | A * | 6/2018 | .............. | F24F 13/00 |
| KR | 10-0158806 | | 8/1998 | | |
| KR | 0143844 | B1 * | 8/1998 | ................ | F24F 6/12 |
| KR | 10-2013-0092093 | | 8/2013 | | |
| KR | 20130092093 | A * | 8/2013 | ................ | F24F 6/08 |
| WO | WO 2021/164366 | | 8/2021 | | |

OTHER PUBLICATIONS

European Search Report dated May 7, 2024 issued in Application No. 23217833.5.

* cited by examiner

*Primary Examiner* — Robert A Hopkins

(74) *Attorney, Agent, or Firm* — KED & ASSOCIATES, LLP

(57) ABSTRACT

This disclosure relates to a humidifier. The humidifier includes a heating water tank which heats water; a humidifying water tank which is connected to the heating water tank, and generates humidified air by using water supplied from the heating water tank; a connection pipe which sends water stored in the heating water tank to the humidifying water tank; and a blowing fan which forms airflow around the connection pipe.

19 Claims, 31 Drawing Sheets

HUMIDIFIER

CROSS-REFERENCE TO RELATED APPLICATION(S)

This application claims priority under 35 U.S.C. § 119 to Korean Application No. 10-2022-0177806, filed in Korea on Dec. 19, 2022, whose entire disclosure(s) is/are hereby incorporated by reference.

BACKGROUND

1. Field

This disclosure relates to a humidifier, and more particularly, to a humidifier that generates humidified air through heating or ultrasonic vibration.

2. Background

A humidifier is an apparatus that evaporates water and discharges humidified air having high moisture content. A humidifier can generate humidified air by vaporizing water through natural evaporation, heat evaporation, or ultrasonic vibration.

Each evaporation method has advantages and disadvantages. In the case of natural evaporation, there is a problem in that a user must frequently manage the humidifying medium used.

In the case of evaporation by ultrasonic vibration, there is a problem that the humidified air may not flow actively into the indoor space as the supplied water is atomized by ultrasonic vibration, a problem that when unsterilized water is humidified, unpleasant humidified air flows into the indoor space, and a problem that ultrasonic vibrator is vulnerable to high temperature heat.

In the case of heat evaporation, safety accidents may occur if hot humidified air is discharged directly.

Korean registered patent KR 10-0158806 discloses a humidifier that humidifies water supplied from a water tank by heating and ultrasonic vibration.

However, the prior document discloses a structure in which a water heating space and a humidifying space are connected to each other. This causes a problem that the water cannot be completely sterilized when the water heating temperature is maintained below a set temperature in consideration of an ultrasonic vibrator. In addition, when water is heated to sterilize and sent to the ultrasonic vibrator, there is a problem that the ultrasonic vibrator may malfunction. That is, in the case of prior document, there is difficulty in completely sterilizing and humidifying water.

In addition, since a separate water level control device is not provided in a space for heating and a space for humidification, there is a problem in that it is difficult to directly control the water level inside a heating water tank or a humidifying water tank. In addition, since a pipe that supplies water from a water tank to the heating water tank is located below the water tank and the heating water tank, there is a problem that residual water occurs inside the pipe before and after use.

BRIEF DESCRIPTION OF THE DRAWINGS

Embodiments will be described in detail with reference to the following drawings in which like reference numerals refer to like elements, and wherein.

DETAILED DESCRIPTION

Figure 1:
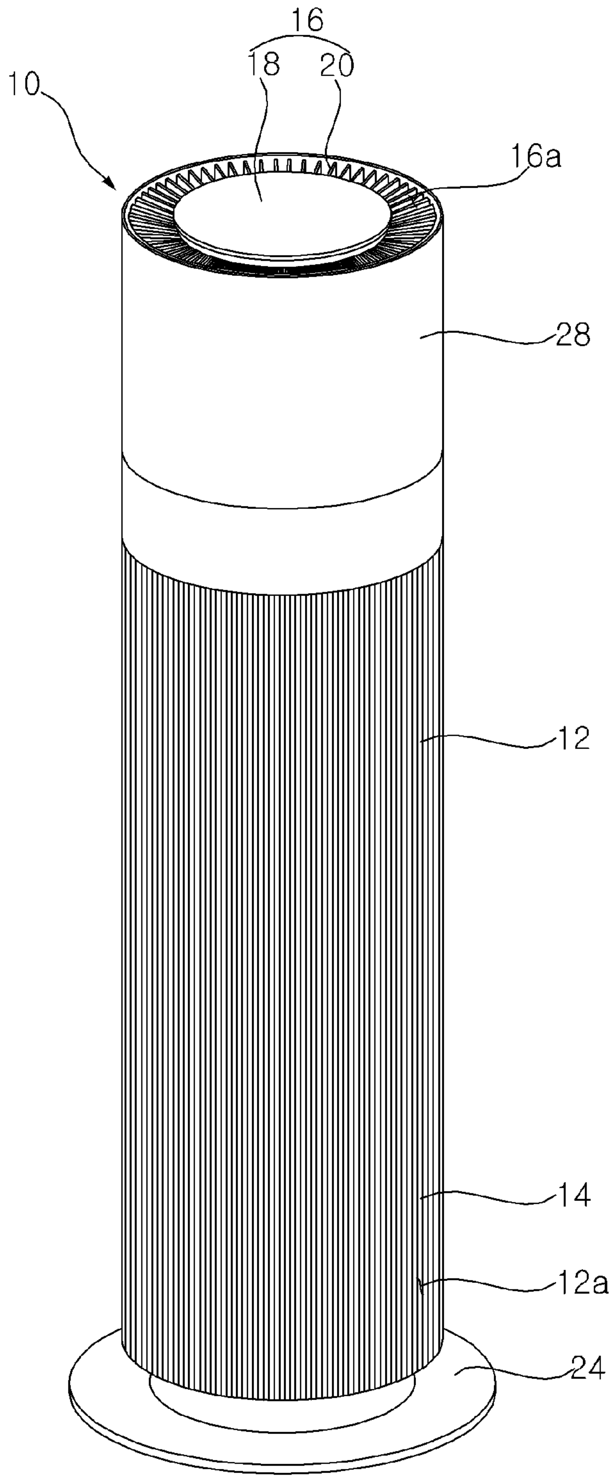
FIG. 1 is a perspective view of a humidifier according to an embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

Expressions such as ‘first’, ‘second’, and ‘third’ expressed in the description are intended to distinguish the composition and do not indicate the order of composition.

Hereinafter, the present disclosure will be described with reference to the drawings for explaining a humidifier according to embodiments of the present disclosure.

<Overall Composition>

A humidifier of the present disclosure may discharge humidified air by using ultrasonic vibration. The humidifier of the present disclosure may discharge humidified air by heating water. The humidifier of the present disclosure may discharge humidified air generated by ultrasonic vibration and humidified air generated by heating.

Figure 2:
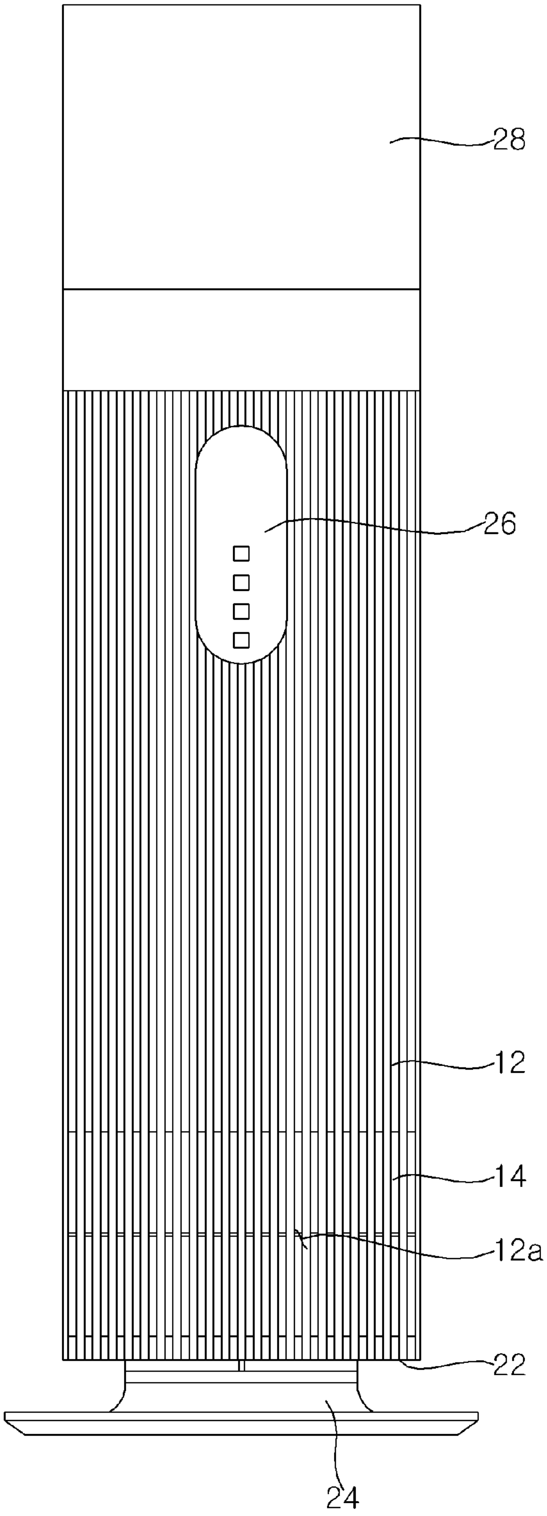
FIGS. 2 is a front view of a humidifier according to an embodiment of the present disclosure.
Figure 3:
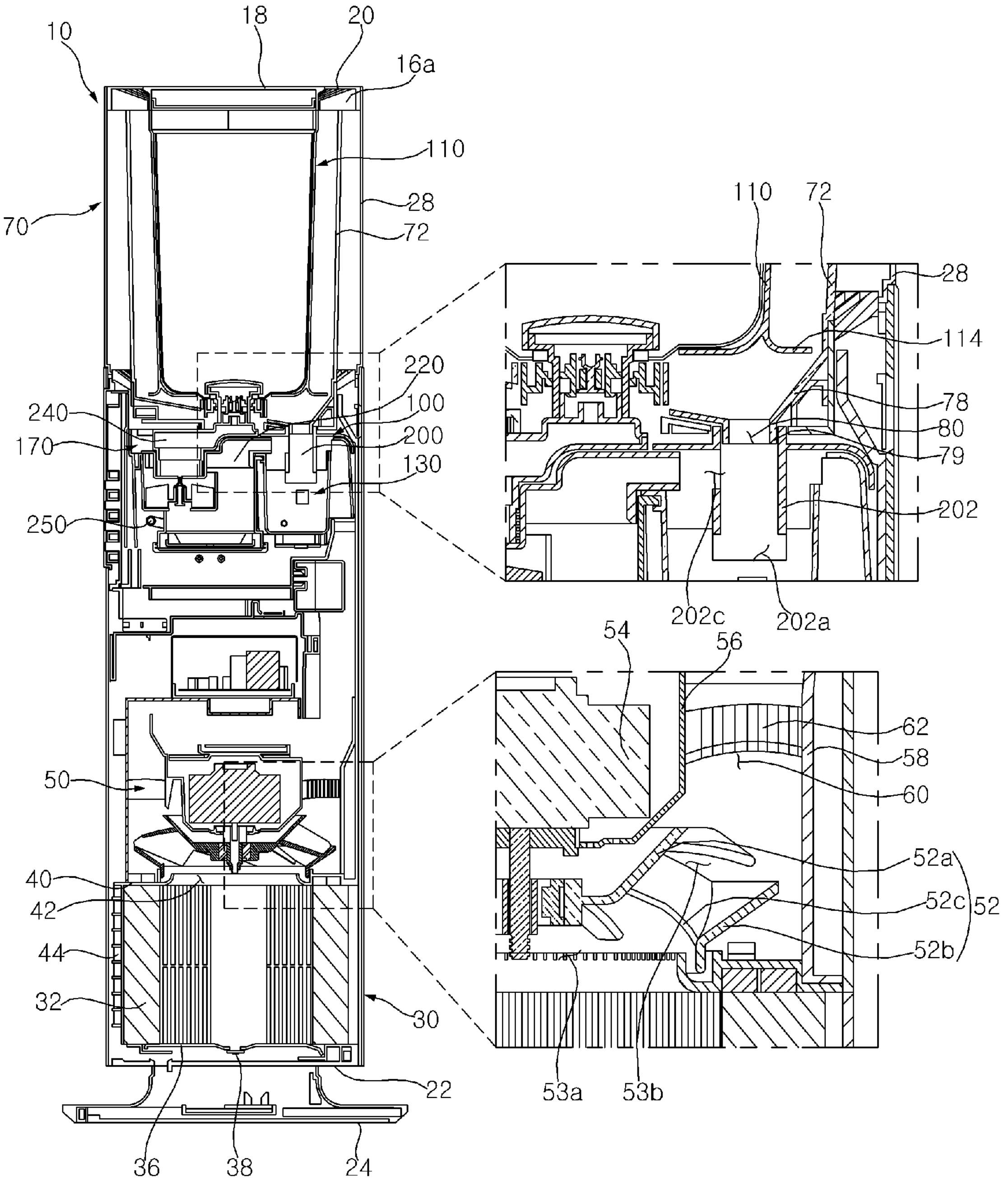
FIG. 3 is a side cross-sectional view of a humidifier according to an embodiment of the present disclosure.

Referring to FIGS. 1 to 3, the humidifier may include a cover 10 that forms an outer shape and has an inlet 12*a* and an outlet 16*a*, a cleaning device 30 that is disposed inside the cover 10 and filters the air flowing into the inlet 12*a*, a blower 50 that is disposed inside the cover 10 and flows the air inside the cover 10 from the inlet 12*a* to the outlet 16*a*, a humidification device 100 that is disposed inside the cover 10 and humidifies a portion of the air flowing to the blower 50, and a discharge guider 70 that sends the air filtered by the cleaning device 30 or the air humidified by the humidification device 100 to the outlet 16*a*.

<Cover>

The cover 10 may have an overall cylindrical shape.

The cover 10 may include an inlet cover 12 forming an inlet 12*a* through which air flows in. The cover 10 may include an outlet cover 16 forming an outlet 16*a* through which air is discharged.

The inlet 12*a* may be formed on the circumferential surface of the cover 10 having a cylindrical shape. The outlet 16*a* may be formed on the upper surface of the cover 10 having a cylindrical shape. The humidifier of the present disclosure may flow air into the circumferential surface and discharge air to the upper surface.

Referring to FIG. 3, the inlet cover 12 may cover the outside of the filter 32 and a blowing housing 58, which will be described below. A plurality of inlets 12*a* may be formed in the inlet cover 12 in the up-down direction and spaced apart in the circumferential direction. The inlet cover 12 may have a plurality of inlets 12*a* that are formed in the up-down direction, and spaced apart in the circumferential direction. The inlet 12*a* may be formed around where the filter 32 is disposed. The inlet 12*a* may be formed in the lower portion of the inlet cover 12.

A plurality of inlet grills 14 extending in the up-down direction are disposed in the inlet cover 12. The plurality of inlet grills 14 may be disposed to be spaced apart in the circumferential direction of the inlet cover 12. A plurality of inlets 12*a* may be formed between the plurality of inlet grills 14.

The inlet cover 12 may be divided into an inlet cover lower part 13*b* where the inlet 12*a* is formed and an inlet cover upper part 13*a* disposed in the upper side of the inlet cover lower part 13*b*. An input panel 26, which will be described below, may be disposed in the inlet cover upper part 13*a*. The inlet cover upper part 13*a* may cover the outer side of the blowing housing 58, and a humidifying water tank 130 and a heating water tank 170 which will be described below.

The outlet cover 16 may have a structure that is separated upward from the outer guider 28 described below. Referring to FIG. 3, the outlet cover 16 may include a water tank cover 18 that covers the upper side of the water tank 110. The outlet cover 16 may include a plurality of discharge grills 20 extending in a radial direction from the outer circumference of the water tank cover 18. A plurality of discharge grills 20 may be disposed to be spaced apart in the circumferential direction on the outer circumference of the water tank cover 18.

Referring to FIG. 1, the discharge grill 20 has a structure extending in a radial direction from the outer circumference of the water tank cover 18. A plurality of discharge grills 20 may be disposed in the upper sides of a first discharge passage 74 and a second discharge passage 76 which will be described below. The plurality of discharge grills 20 may be disposed to be spaced apart in the circumferential direction. A plurality of outlets 16*a* may be formed between the plurality of discharge grills 20.

The air flowing through the first discharge passage 74 and the air flowing through the second discharge passage 76 may be mixed between the plurality of discharge grills 20. In each of the plurality of discharge grills 20, the height of the outer circumferential end is formed to be higher than the height of the inner circumferential end. Accordingly, the air flowing through the first discharge passage 74 and the second discharge passage 76 may be guided inward in the radial direction.

The cover 10 may include an outer guider 28 that guides the air flowing inside to the outlet 16*a*. The outer guider 28 may be included in the configuration of the discharge guider 70 described below.

The cover 10 may include a lower cover 22 that covers the lower side of the inlet cover 12.

The humidifier may include a pedestal 24 that is disposed in the lower side of the cover 10 and separates the lower cover 22 from the ground by a certain distance. The upper end of the pedestal 24 may be connected to the lower cover 22. The lower cover 22 may be disposed to cover the lower surface of the humidifier spaced upward from the ground by the pedestal 24.

Referring to FIG. 2, an input panel 26 is disposed in one side of the cover 10. The input panel 26 allows a user to control the power or operation of the humidifier. A display for displaying the operating state or the like of the humidifier to a user may be disposed in the input panel 26.

<Cleaning Device>

The cleaning device 30 may filter the air introduced through the inlet 12*a* through the filter 32. The cleaning device 30 may flow the filtered air upward.

Referring to FIG. 3, the cleaning device 30 includes a filter 32 that filters the air flowing into the inlet 12*a*, and a filter mounter 34 that fixes the dislocation of the filter 32 inside the cover 10.

The filter 32 may have a cylindrical shape. Accordingly, the filter 32 may filter the air sucked from the front, rear, left, and right directions perpendicular to the up-down direction. The air introduced from the inlet 12*a* may flow into the inner space of the filter 32. The air passed through the filter 32 may flow to the blower 50 disposed in the upper side of the filter 32.

The filter mounter 34 includes a filter mounting plate 36 disposed in the lower side of the filter 32, a filter upper plate 40 disposed in the upper side of the filter 32, and a filter support 44 connecting the filter mounting plate 36 and the filter upper plate 40.

The filter mounting plate 36 is disposed in the lower side of the filter 32. The filter mounting plate 36 moves up and down, and may detect whether the filter 32 is disposed. A fan sterilizing device 38 that irradiates ultraviolet light upward may be disposed in the center of the filter mounting plate 36. The fan sterilizing device 38 may sterilize the inside of the blowing fan 52 or filter 32 described below.

An orifice 42 may be formed in the filter upper plate 40. The orifice 42 may be formed in the center of the filter upper plate 40. The orifice 42 may allow the air introduced to the inner side of the filter 32 to flow to the blowing fan 52. The inner circumferential end of the filter upper plate 40 has a shape bent upward, so that air flowing upward in the inner space of the filter 32 can be guided to the blowing fan 52.

The filter support 44 may connect the filter mounting plate 36 and the filter upper plate 40. The filter support 44 may be disposed to be spaced apart in the circumferential direction.

<Blower>

The blower 50 includes a blowing fan 52 that generates airflow inside the cover 10, and a fan motor 54 that rotates the blowing fan 52.

Referring to FIG. 3, the blowing fan 52 may utilize a mixed flow fan forming a fan inlet 53*a* at one side and a fan outlet 53*b* in the opposite direction of the fan inlet 53*a* and in a centrifugal direction. The blowing fan 52 may include a hub 52*a* connected to the fan motor 54, a shroud 52*b* that is disposed spaced apart from the hub 52*a* by a certain distance and forms the fan inlet 53*a*, and a blade 52*c* extending in a radial direction to connect the hub 52*a* and the shroud 52*b*. A plurality of blades 52*c* may be disposed to be spaced apart from each other in the circumferential direction. The fan motor 54 may be disposed in the upper side of the blowing fan 52.

The blower device includes a motor housing 56 that covers the outside of the fan motor 54, and a blowing housing 58 that is disposed to be spaced outward in a radial direction from the motor housing 56 and guides the air flowing by the blowing fan 52 upward.

A blowing passage 60 through which air flowing by the blowing fan 52 flows upward may be formed between the motor housing 56 and the blowing housing 58. An inlet cover 12 may be disposed in the outside of the blowing housing 58.

The blower 50 may include a diffuser 62 that is disposed between the motor housing 56 and the blowing housing 58 and reduces the rotational component of air flowing upward by the blowing fan 52. A plurality of diffusers 62 may be disposed to be spaced apart in the circumferential direction.

<Discharge Guider>

Referring to FIG. 3, the discharge guider 70 includes an inner guider 72 disposed to be spaced toward the outside of the water tank 110. The discharge guider 70 includes an outer guider 28 disposed to be spaced toward the outside of the inner guider 72. The outer guider 28 may be included in some components of the cover 10.

The annular second discharge passage 76 is formed between the outer guider 28 and the inner guider 72. The first discharge passage 74 having a smaller cross-sectional area than the second discharge passage 76 is formed between the inner guider 72 and the water tank 110.

The second discharge passage 76 is disposed outside the first discharge passage 74.

The discharge guider 70 includes a lower guide wall 78 disposed in the lower side of the inner guider 72. An exhaust hole 80 connected to an exhaust pipe 202, which will be described below, is formed in one side of the lower guide wall 78. Humidified air flowing from a humidifying chamber 130*a* may flow into the first discharge passage 74 through the exhaust hole 80.

The lower guide wall 78 is connected to the inner guider 72 at the upper side. The exhaust hole 80 may be formed at the lowest position of the lower guide wall 78. The lower guide wall 78 may form an inclined surface whose height increases toward the outside from an area where the exhaust hole 80 is formed. The upper end of the lower guide wall 78 may be formed at the same height so that it is connected to the inner guider 72.

The exhaust hole 80 is formed at a certain distance from the center of the lower guide wall 78. Accordingly, the inclination angle of the inclined surface of the lower guide wall 78 may vary depending on the direction in which it extends from the exhaust hole 80. The inclined surface formed from the area where the exhaust hole 80 is formed may vary depending on the location.

The lower guide wall 78 may allow the condensed water generated in the first discharge passage 74 to flow into the humidifying chamber 130*a*. The condensed water generated in the first discharge passage 74 may flow into the exhaust hole 80 along the lower guide wall 78.

The condensed water flowing into the exhaust hole 80 may flow into the humidifying chamber 130*a* through the exhaust pipe 202.

The water tank 110 includes a barrier 114 that protrudes outward in a radial direction from the lower end of an outer water tank 112 described below. The barrier 114 is formed along the outer circumference at the lower end of the outer water tank 112. The barrier 114 may be formed to have different degrees of protrusion from the outer water tank 112 depending on its distance from the exhaust hole 80.

<Humidification Device>

Hereinafter, a humidification device according to an embodiment of the present disclosure will be described with reference to FIGS. 3 to 25.

The humidification device 100 may generate humidified air by heating water stored in the water tank 110. The humidification device 100 may generate humidified air by ultrasonic vibration of water stored in the water tank 110. The humidification device 100 may heat water stored in the water tank 110 and generate humidified air by using ultrasonic vibration. The humidification device 100 may generate humidified air generated by heating water and humidified air generated by ultrasonic vibration together.

Referring to FIGS. 3 to 6, and FIG. 25, the humidification device 100 includes a water tank 110 that stores water, a heating chamber 170*a* that receives water stored in the water tank 110 and heats the received water, and a humidifying chamber 130*a* that receives water from the heating chamber 170*a* and humidifies the received water.

The heating chamber 170*a* may mean a space in which water is heated by a heater 186 described below. A space may be contained in the inside of the heating chamber 170*a* to form a vapor generated from water heated by the heater 186. A plurality of outer circumferences forming the heating chamber 170*a* may be formed.

A space of the heating chamber 170*a* may be formed by the heating water tank 170 and a second connector 220 which will be described below.

The humidifying chamber 130*a* may mean a space in which water is humidified by an ultrasonic oscillator 162*a*, 162*b* described below. A plurality of outer circumferences forming the humidifying chamber 130*a* may be formed. A space of the humidifying chamber 130*a* may be formed by the humidifying water tank 130 and a first connector 200 described below.

The heating chamber 170*a* and the humidifying chamber 130*a* may be connected to each other through two passages 230*a* and 250*a*. The humidifying chamber 130*a* and the heating chamber 170*a* may be connected to each other below an area where a floating valve 190 described below is disposed. The humidifying chamber 130*a* and the heating chamber 170*a* may be connected to each other above the area where the floating valve 190 is disposed. The two passages through which the humidifying chamber 130*a* and the heating chamber 170*a* are connected to each other may be disposed to be spaced apart from each other in the up-down direction.

The humidifying chamber 130*a* and the heating chamber 170*a* may be connected to each other in the water storage area below an area where the floating valve 190 is disposed, and be connected to each other in a different area spaced upwardly from an area where water is stored above the floating valve 190.

The heating chamber 170*a* and the humidifying chamber 130*a* may be connected to each other through a first connection passage 250*a* and a second connection passage 230*a*. The first connection passage 250*a* may be a passage connecting the water storage areas of each of the humidifying chamber 130*a* and the heating chamber 170*a*. The water stored in the heating chamber 170*a* may flow into the humidifying chamber 130*a* through the first connection passage 250*a*.

The second connection passage 230*a* may be a passage connecting the humidifying chamber 130*a* and another area spaced upwardly from the area where the water of heating chamber 170*a* is stored. Air in the heating chamber 170*a* may flow into the humidifying chamber 130*a* through the second connection passage 230*a*.

The first connection passage 250*a* may be formed inside a connection pipe 250 (or 'first connection pipe') described below. The second connection passage 230*a* may be formed inside an air flow pipe 230 (or 'second connection pipe') described below.

Water heated in the heating chamber 170*a* may be supplied to the humidifying chamber 130*a* through the first connection passage 250*a*. Vapor generated by heating water in the heating chamber 170*a* may flow into the humidifying chamber 130*a* through the second connection passage 230*a*. Accordingly, the humidified air discharged from the humidifying chamber 130*a* may be a humidified air heated through the heating chamber 170*a* or a humidified air heated in the heating chamber 170*a* and humidified in the humidifying chamber 130*a*. That is, the humidified air discharged through the humidifying chamber 130*a* may be air that is heated and sterilized through the heating chamber 170*a*.

The humidification device 100 includes a heating water tank 170 that is disposed below the water tank 110 and heats the water stored therein. The humidification device 100 includes a humidifying water tank 130 that humidifies the water stored therein by using ultrasonic vibration. The humidification device 100 includes a connection pipe 250 that supplies water stored in the heating water tank 170 to the humidifying water tank 130. A first connection passage 250*a* may be formed inside the connection pipe 250. The connection pipe 250 may use stainless steel pipe.

The humidification device 100 includes a first connector 200 that connects the humidifying water tank 130 and the internal space of the discharge guider 70. The humidification device 100 includes a second connector 220 that connects the humidifying water tank 130 and the heating water tank 170. The humidification device 100 includes a water supply pipe 240 that supplies water discharged from the water tank 110 to the heating water tank 170.

The humidification device 100 includes a water tank cover 18 that forms a space in which the humidifying water tank 130 and the heating water tank 170 are disposed. The water tank cover 18 is disposed to be spaced radially inward from the inlet cover 12. The rising air by the blower 50 may flow between the water tank cover 18 and the inlet cover 12.

The humidification device 100 includes a water tank 110 that forms a space in which water is stored and supplies water to the humidifying water tank 130 or the heating water tank 170.

The water tank 110 is disposed in the upper side of the humidifying water tank 130. The water tank 110 is disposed in the upper side of the heating water tank 170. The water tank 110 has a structure that opens upward. The water tank 110 includes a cap 118 that opens and closes the opening hole formed on the lower surface. The cap 118 is disposed in the water tank 110 to be movable up and down. When the cap 118 moves upward, the opening hole may be opened.

Figure 4:
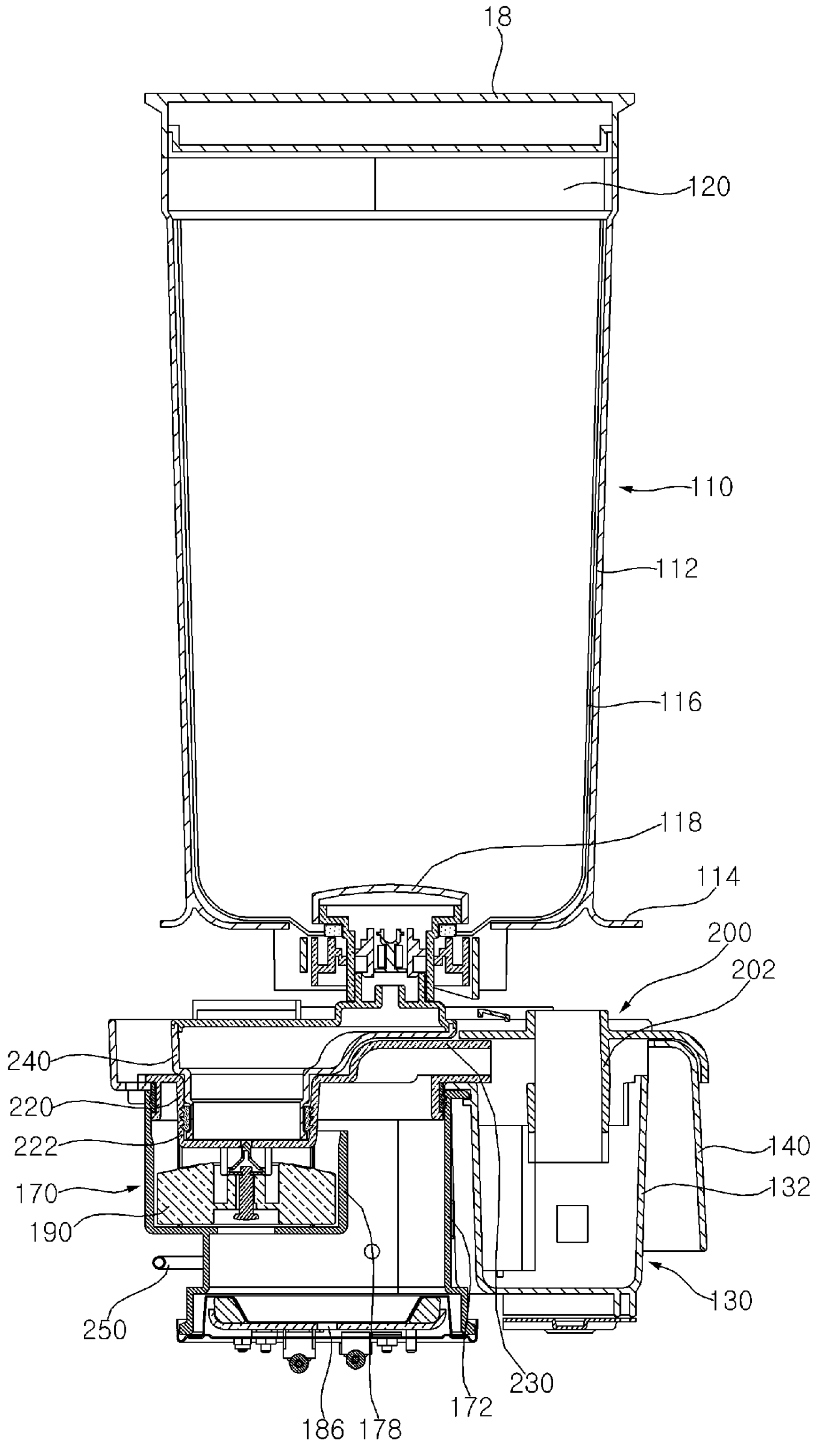
FIG. 4 is a cross-sectional view for explaining the arrangement relationship of a water tank, a heating water tank, and a humidifying water tank according to an embodiment of the present disclosure.
Figure 5:
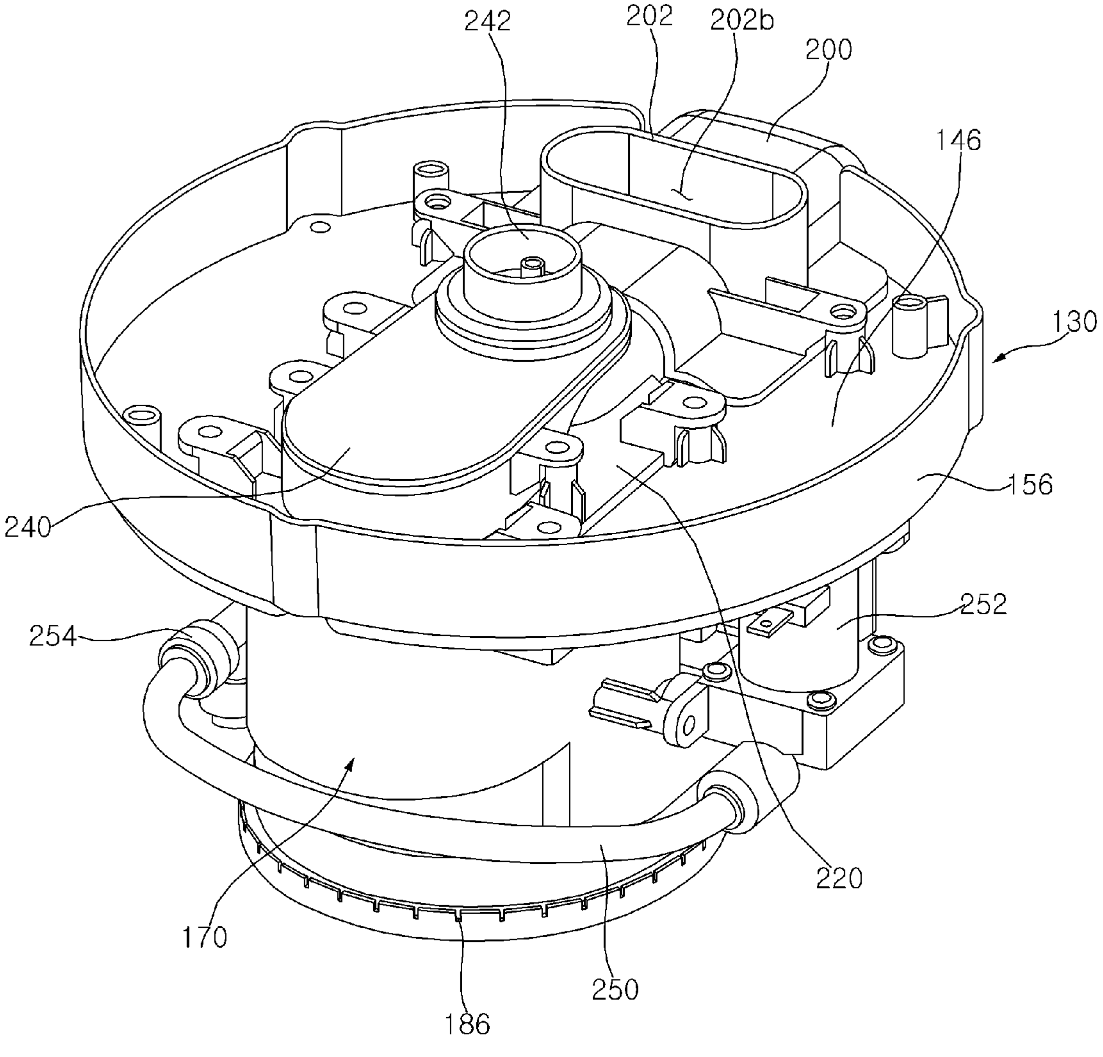
FIG. 5 is a perspective view of a humidifying water tank, a heating water tank, a first connector, a second connector, and a water supply pipe in combination, according to an embodiment of the present disclosure.
Figure 6:
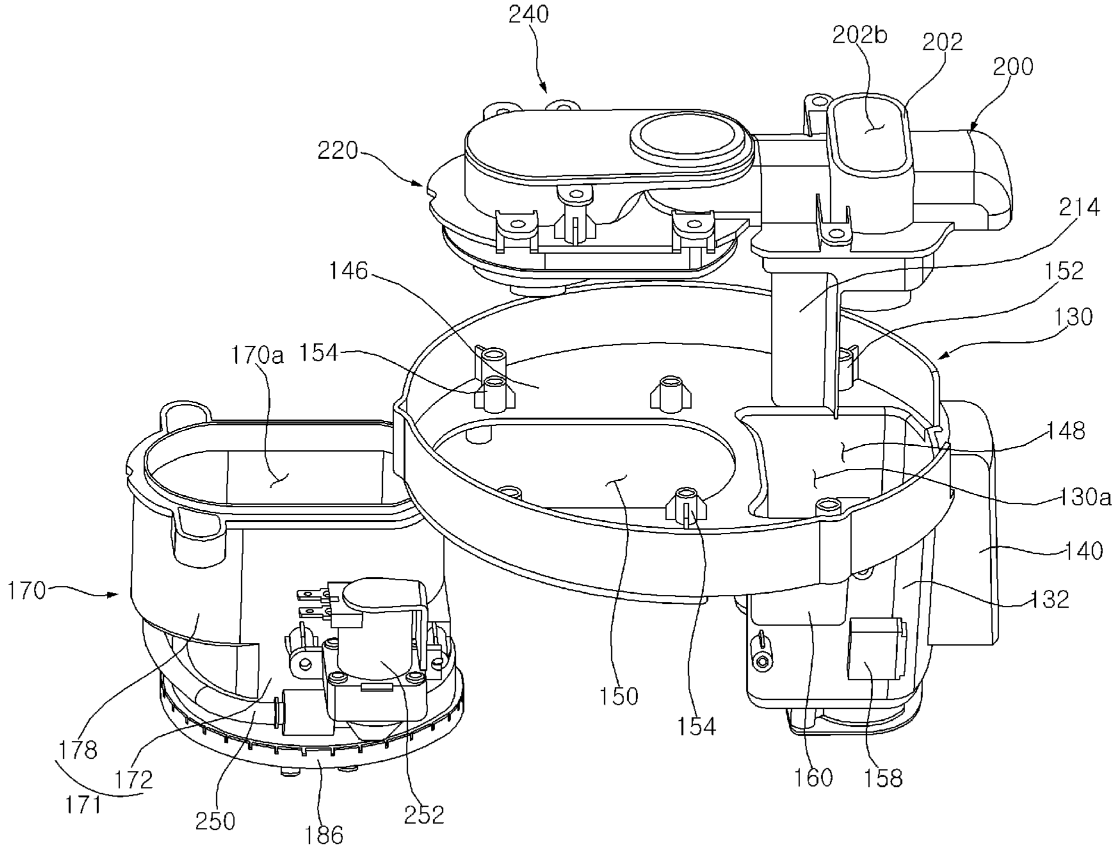
FIG. 6 is an exploded view of FIG. 5.

Referring to FIGS. 3 and 4, the water tank 110 of the present disclosure includes an outer water tank 112 and an inner water tank 116. The outer water tank 112 may be fixedly disposed in the inside of the cover 10, and may fix the dislocation of the inner water tank 116. The outer water tank 112 may guide the movement of the inner water tank 116 so that the inner water tank 116 is disposed at the upper end of the water supply pipe 240.

A barrier 114 protruding outward in the radial direction is disposed at the lower end of the outer water tank 112. The barrier 114 may be disposed in the upper side of the lower guide wall 78 so that the humidified air flowing into the first discharge passage 74 along the lower guide wall 78 may be guided to flow evenly throughout the first discharge passage 74. In the barrier 114, as it becomes closer to the exhaust hole 80, the length protruding from the outer water tank 112 becomes longer.

The inner water tank 116 moves along the outer water tank 112 and may be disposed to be coupled to a water tank connector 242 of the water supply pipe 240. The cap 118 is disposed at the lower portion of the inner water tank 116. A handle 120 may be disposed in the upper side of the inner water tank 116. A user may move the inner water tank 116 through the handle 120. The handle 120 is rotatably disposed in the inner water tank 116.

Humidifying Water Tank>

Hereinafter, the humidifying water tank of the present disclosure will be described with reference to FIGS. 7 to 9.

The humidifying water tank 130 includes a humidifying water tank wall 132 that forms a space in which water supplied from the heating water tank 170 is stored. The humidifying water tank wall 132 may have a cylindrical structure with an open top and a hollow interior. A humidifying chamber 130*a* may be formed inside the humidifying water tank wall 132.

The ultrasonic oscillator 162*a*, 162*b* may be disposed on the lower surface of the humidifying water tank wall 132 to vibrate and atomize the water stored inside the humidifying water tank wall 132. Two ultrasonic oscillators 162*a*, and 162*b* may be disposed on the lower surface of the humidifying water tank wall 132. The center of each of a pair of ultrasonic oscillators 162*a* and 162*b* may be disposed at a location overlapping a lower hole 202*a* or an upper hole 202*b* of the exhaust pipe 202. Accordingly, the humidified air that is generated by the ultrasonic oscillator 162*a*, 162*b* and flows upward may flow into the exhaust pipe 202.

Figure 7:
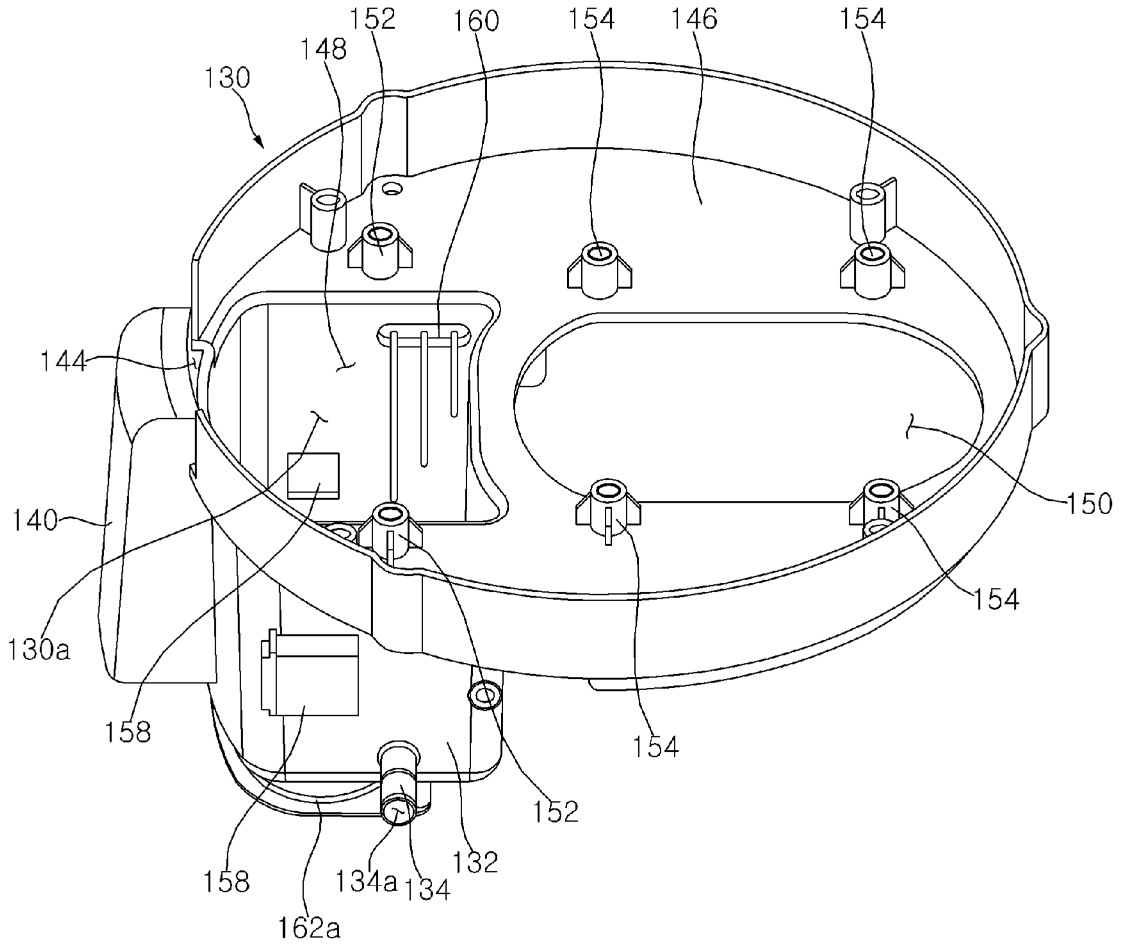
FIG. 7 is a perspective view of a humidifying water tank according to an embodiment of the present disclosure.

Referring to FIG. 7, a water inlet hole 134*a* through which water is supplied to the humidifying water tank 130 is formed in one side of the circumferential surface of the humidifying water tank wall 132. Water stored in the water tank 110 may be supplied into the humidifying water tank 130 through the water inlet hole 134*a*. Water stored in the water tank 110 may be directly supplied to the humidifying water tank 130 through the water inlet hole 134*a*. In addition, water stored in the water tank 110 may be supplied to the humidifying water tank 130 through the water inlet hole 134*a* via the heating water tank 170. In the present disclosure, water heated in the heating water tank 170 is supplied to the humidifying water tank 130 through the water inlet hole 134*a*.

A water inlet pipe 134 protruding outside the circumferential surface of the humidifying water tank wall 132 is disposed around the water inlet hole 134*a*. The water inlet pipe 134 may be connected to the connection pipe 250. A mounting groove 136 into which an insertion protrusion 176 of the heating water tank 170 described below is inserted may be formed in one side of the upper end of the humidifying water tank wall 132. The mounting groove 136 may be disposed in the opposite direction to an air supply pipe 140.

Figure 8:
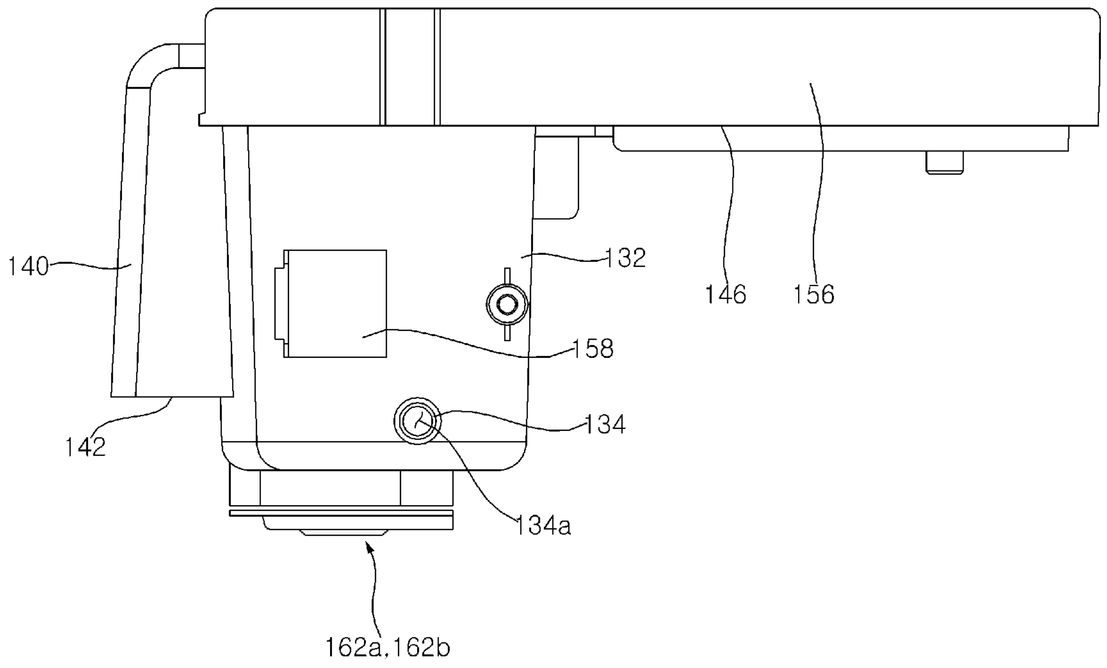
FIG. 8 is a side view of FIG. 7.
Figure 9:
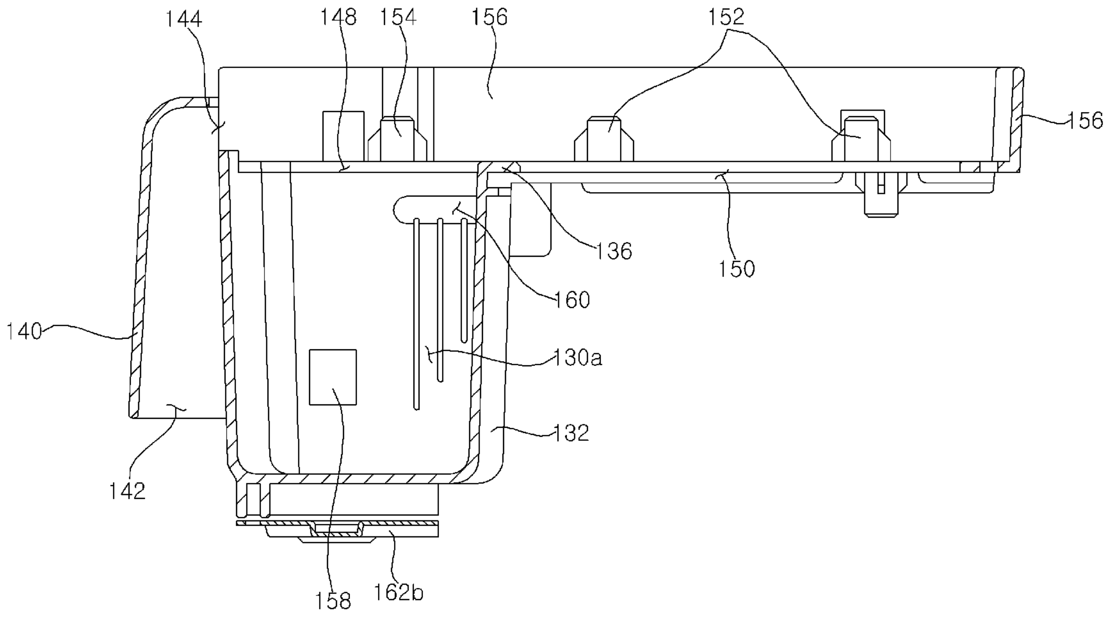
FIG. 9 is a cross-sectional view of one side of FIG. 7.

Referring to FIGS. 7 to 9, in the humidifying water tank 130, the air supply pipe 140 which is disposed around one side of the humidifying water tank wall 132, and through which a portion of the air flowing by the blower 50 is supplied is disposed. In the air supply pipe 140, a supply pipe inlet 142 opened downward and a supply pipe outlet 144 opened to the humidifying chamber 130*a* are formed. The air supply pipe 140 may have a shape in which the cross-sectional area of the passage decreases as it progresses toward the upper side.

Referring to FIG. 9, the supply pipe inlet 142 is formed at the lower end of the air supply pipe 140, and the supply pipe outlet 144 is formed at the upper end of the air supply pipe 140. The supply pipe inlet 142 is opened downward. The supply pipe outlet 144 may be opened in a direction perpendicular to the supply pipe inlet 142.

The supply pipe outlet 144 may be opened from the upper side of the humidifying water tank wall 132 toward the exhaust pipe 202 described below. The supply pipe outlet 144 is disposed at a higher location than the lower hole 202*a* of the exhaust pipe 202.

The air supply pipe 140 may allow a portion of the air flowing upward through the blowing passage 60 to flow into the humidifying chamber 130*a*. The humidified air generated in the humidifying chamber 130*a* may quickly flow upward due to the air flowing through the air supply pipe 140.

Referring to FIG. 7, the humidifying water tank 130 may include an upper plate 146 disposed in the upper side of the humidifying water tank wall 132, and an upper peripheral wall 156 extending upward from the outer circumferential end of the upper plate 146.

The heating water tank 170, the first connector 200, and the second connector 220, which will be described below, may be connected to the humidifying water tank 130 through the upper plate 146.

Referring to FIG. 7, a first hole 148, which is opened to the upper side of the humidifying water tank wall 132, is formed in the upper plate 146. A second hole 150, which is opened upward and downward in the area where the heating chamber 170*a* is disposed, is formed in the upper plate 146.

The first hole 148 is a hole opened to the upper side of the humidifying chamber 130*a*. A first connector 200, which will be described below, may be disposed in the first hole 148.

A heating water tank 170 is disposed in the lower side of the second hole 150. A second connector 220, which will be described below, may be disposed in the upper side of the second hole 150. A first fastening protrusion 152 protruding upward may be formed in the upper surface of the upper plate 146 to be fastened to the first connector 200. A second fastening protrusion 154 protruding upward may be formed in the upper surface of the upper plate 146 to be fastened to the second connector 220.

The upper peripheral wall 156 has a structure extending upward from the outer circumferential end of the upper plate 146. A supply pipe outlet 144 of the air supply pipe 140 is formed in one side of the upper peripheral wall 156. The supply pipe outlet 144 may be formed in the upper side of the upper plate 146.

In the humidifying water tank 130, a sterilizing device 158 may be disposed in one side of the humidifying water tank wall 132. The sterilizing device 158 may be disposed in one side of the humidifying water tank wall 132 and may sterilize water stored inside the humidifying water tank wall 132. Two sterilizing devices 158 that sterilize the inside of the humidifying water tank 130 may be disposed in opposite sides of the humidifying water tank 130 of the present disclosure. The sterilizing device 158 may radiate ultraviolet light into the humidifying water tank wall 132.

A water level sensor 160 may be disposed in the humidifying water tank 130 to detect the level of water stored inside the humidifying water tank 130. The water level sensor 160 may be disposed in one side of the humidifying water tank wall 132. The water level of the humidifying water tank 130 may be set to be the same as the water level of the heating water tank 170. The humidifying water tank 130 and the heating water tank 170 may be connected through the connection pipe 250 to form the same water level. Therefore, it is also possible to determine the water level of the heating water tank 170 by using the water level of the humidifying water tank 130 detected by the water level sensor 160.

Heating Water Tank>

Hereinafter, the heating water tank 170 of the present disclosure will be described with reference to FIGS. 10 to 12.

The heating water tank 170 includes a heating water tank wall 171 that stores water.

The heating water tank wall 171 includes an outer wall 172 disposed in the outer circumference. The heating water tank wall 171 includes an inner wall 178 which is disposed inside the outer wall 172, and in which the floating valve 190 is disposed.

The outer wall 172 may have a cylindrical shape opened upward so that water can be stored. Referring to FIG. 12, the outer wall 172 may be hollow on the inside and have a cylindrical shape that is opened up and down. A heater 186 is disposed in the lower side of the outer wall 172. The heater 186 may be a circular sheath heater. The sheath heater may heat the lower wall of the heating water tank 170. Therefore, the lower wall of the heating water tank 170 can use a separate heating plate which is heated by a separate sheath heater.

A water discharge hole 174*a* through which water stored in the heating water tank 170 is discharged may be formed on one side of the outer wall 172. A water discharge pipe 174 that protrudes outward around the water discharge hole 174*a* may be formed in one side of the outer wall 172.

The water discharge pipe 174 may be disposed at a higher location than or at the same location as the water inlet pipe 134 formed on the humidifying water tank wall 132. The water discharge pipe 174 may be disposed to be spaced apart upward from the lower end of the heating water tank 170.

Figure 10:
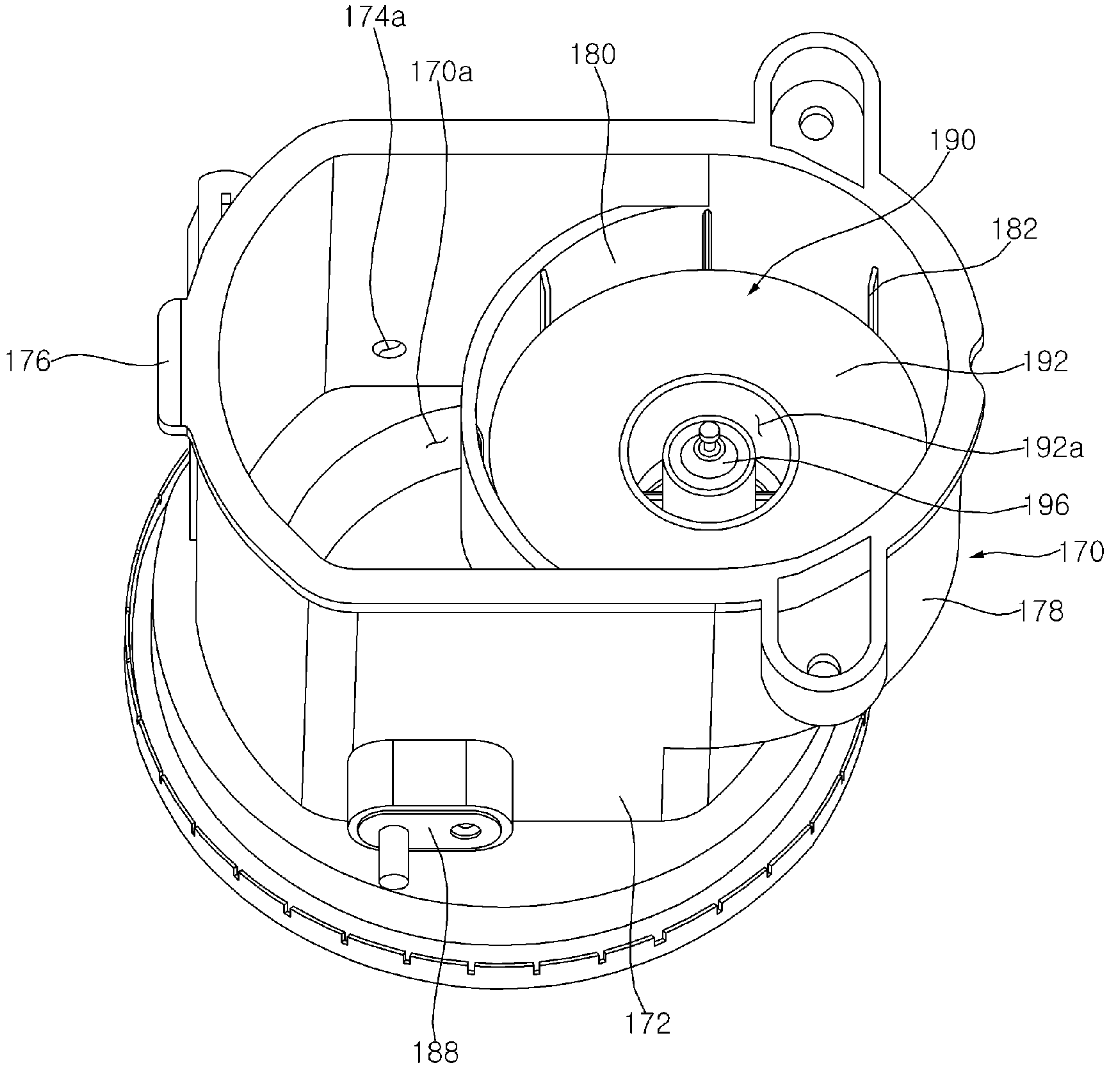
FIG. 10 is a perspective view of a heating water tank according to an embodiment of the present disclosure.
Figure 11:
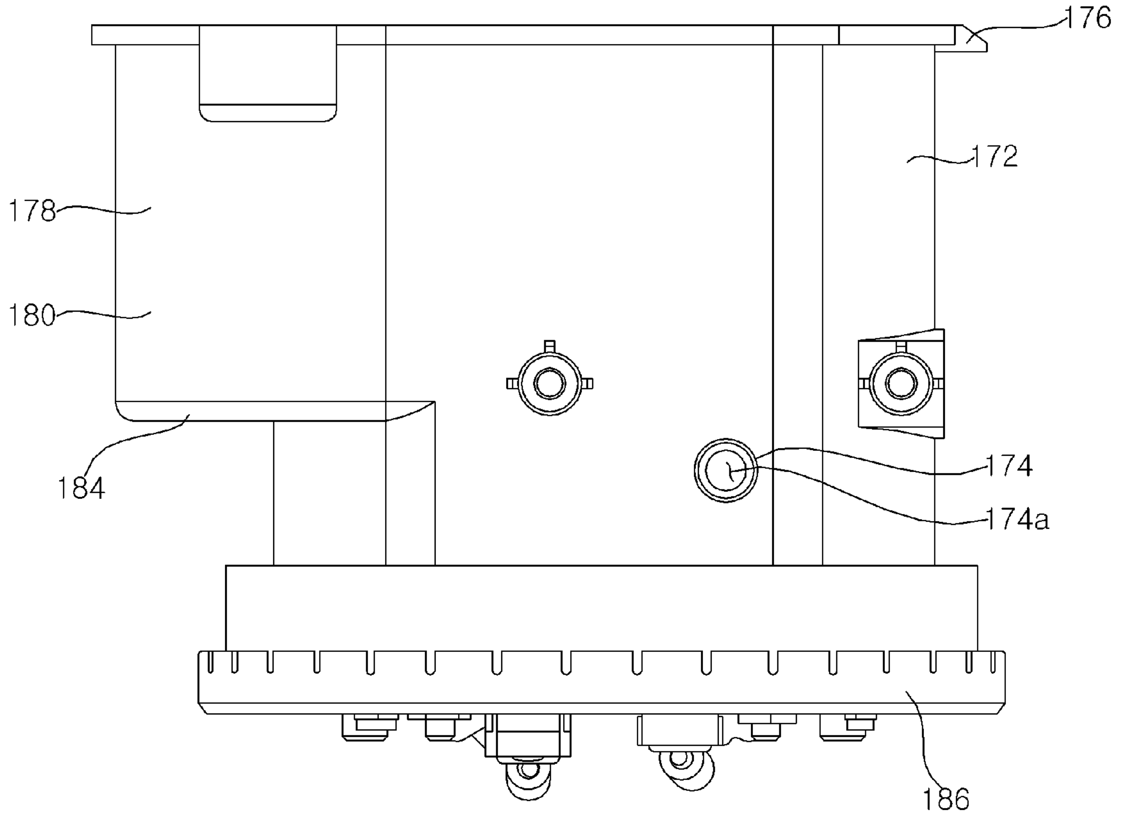
FIG. 11 is a side view of FIG. 10.

Referring to FIG. 10, an insertion protrusion 176 may be disposed in one side of the upper end of the outer wall 172. The insertion protrusion 176 may be inserted into the mounting groove 136 formed in one side of the upper end of the humidifying water tank wall 132.

A temperature sensor 188 that detects the temperature inside the heating chamber 170*a* is disposed in one side of the outer wall 172.

The temperature sensor 188 detects the temperature of water stored inside the heating water tank 170. The temperature sensor 188 is disposed lower than the water discharge pipe 174.

The inner wall 178 is disposed inside the outer wall 172. One circumferential surface of the inner wall 178 may be disposed to overlap one circumferential surface of the outer wall 172. The inner wall 178 includes an inner peripheral wall 180 protruding to the inside of the outer wall 172 and an inner lower wall 184 that restricts downward movement of the floating valve 190.

An inner rib 182 protruding to the inner side where the floating valve 190 is disposed is disposed in the inside of the inner peripheral wall 180. The inner rib 182 may space the floating valve 190 from the inner peripheral wall 180 by a certain distance. In addition, the inner rib 182 may prevent the floating valve 190 disposed inside the inner peripheral wall 180 from rotating in the circumferential direction.

A plurality of inner ribs 182 spaced apart in the circumferential direction may be disposed on the inner circumferential surface of the inner peripheral wall 180. The inner rib 182 may have a structure extending in the up-down direction from the inner circumferential surface of the inner peripheral wall 180.

The upper side of the inner peripheral wall 180 is opened, and the inner lower wall 184 is disposed in the lower side of the inner peripheral wall 180. The upper end of the inner peripheral wall 180 may be disposed lower than the upper end of the outer wall 172. The lower end of the inner peripheral wall 180 may be disposed higher than the lower end of the outer wall 172.

Figure 12:
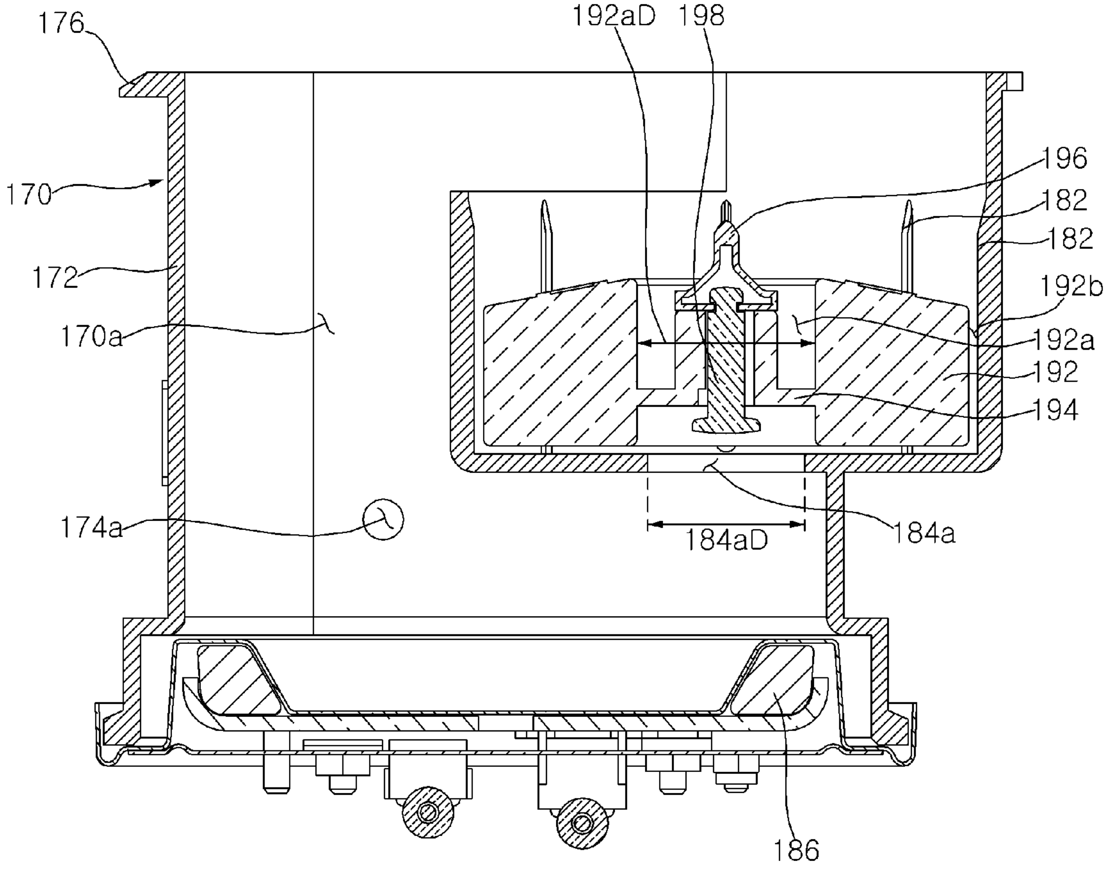
FIG. 12 is a cross-sectional view of one side of FIG. 10.
Figure 13:
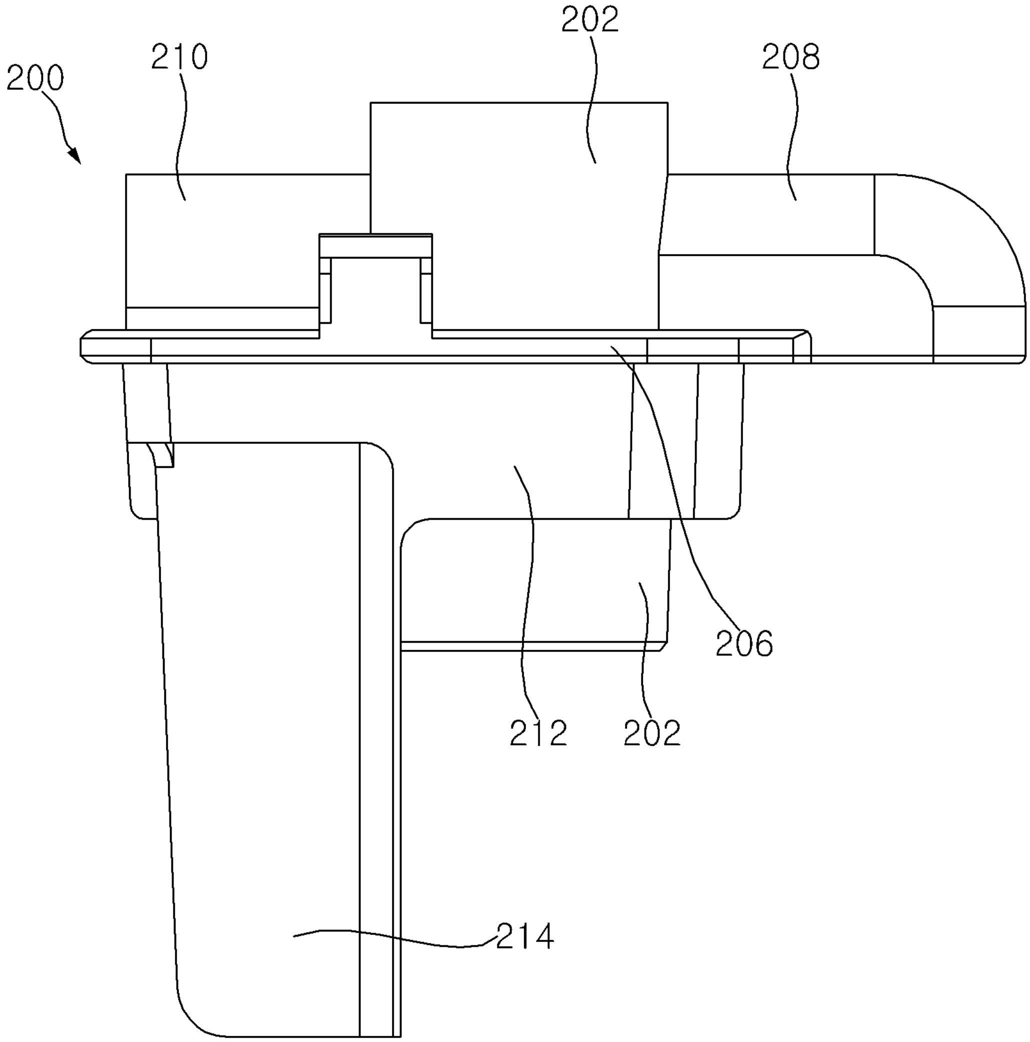
FIG. 13 is a side view of a first connector according to an embodiment of the present disclosure.
Figure 14:
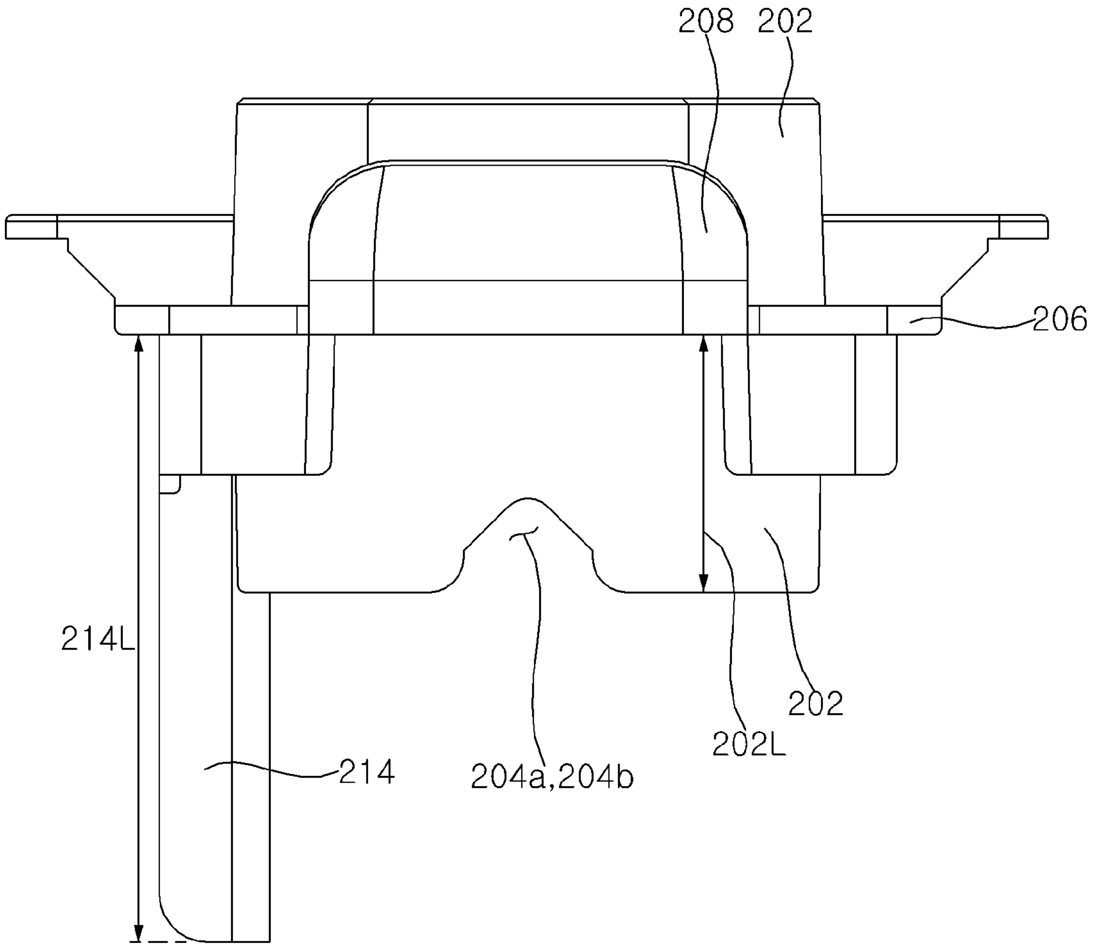
FIG. 14 is a front view of FIG. 13.
Figure 15:
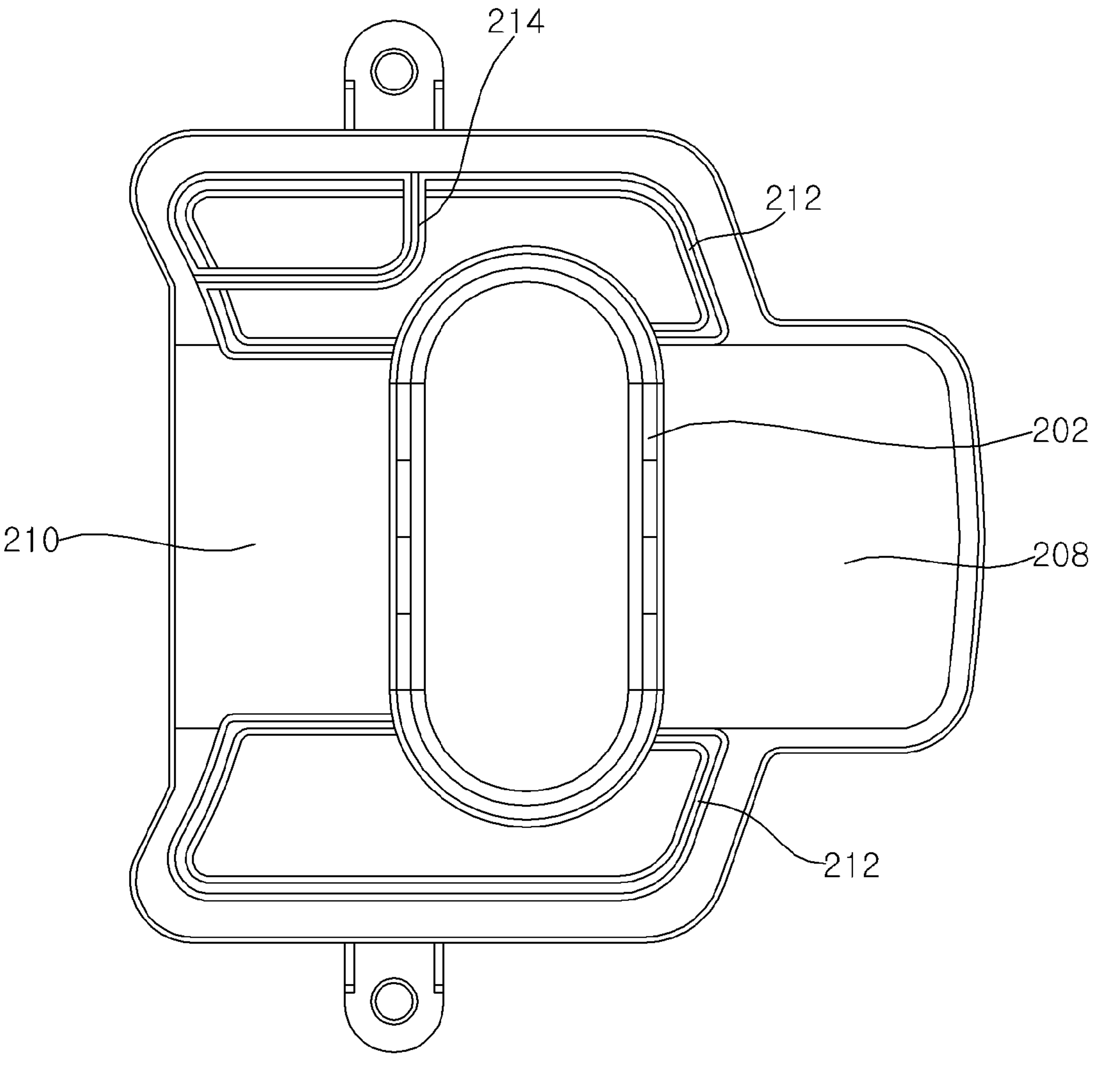
FIG. 15 is a bottom view of FIG. 13.
Figure 16:
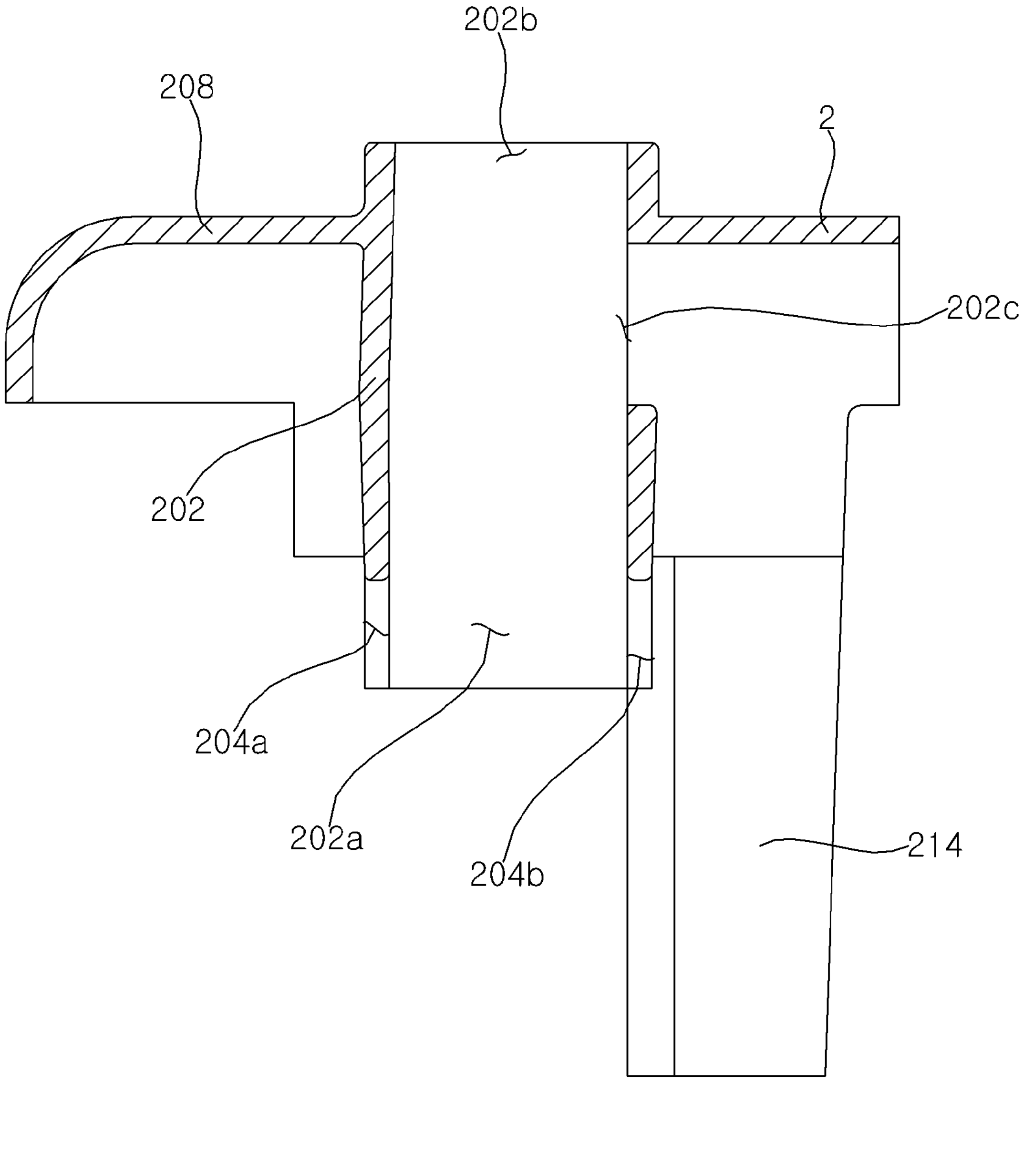
FIG. 16 is a cross-sectional view of one side of FIG. 13.

Referring to FIG. 12, a communication hole 184*a* is formed in the center of the inner lower wall 184. The communication hole 184*a* communicates the inside of the inner wall 178 and the inside of the outer wall 172. Water flowing into the inner wall 178 through the communication hole 184*a* may be supplied to the outer wall 172.

The center of the inner wall 178 may be formed differently from the center of the outer wall 172. Here, the center of the inner wall 178 may mean the center of the inner lower wall 184 where the floating valve 190 is disposed. In addition, the center of the outer wall 172 may mean the center of the area where the heater 186 is disposed.

The floating valve 190 may be disposed inside the inner wall 178. The height of the floating valve 190 may vary depending on the amount of water stored in the outer wall 172. The floating valve 190 may open and close a water supply hole 222*a* of the second connector 220 described below depending on the height.

The floating valve 190 may be disposed inside the heating water tank 170 to adjust the water level inside the heating water tank 170. The floating valve 190 may be disposed inside the heating water tank 170 to adjust the water level of the humidifying water tank 130. The water level of the humidifying water tank 130 is adjusted according to the dislocation of the floating valve 190. The floating valve 190 is disposed in the upper side of the connection pipe 250.

The floating valve 190 is disposed to be movable up and down inside the inner wall 178. The floating valve 190 has a water discharge hole 174*a* or a water inlet hole 134*a* located lower than the lowest location inside the inner wall 178.

The floating valve 190 may be located lower than the lower end of the exhaust pipe 202, at the highest location inside the inner wall 178. Accordingly, even if the water level is formed at the highest location inside the humidifying water tank 130, the water level inside the humidifying water tank 130 may be formed lower than the lower end of the exhaust pipe 202. When the floating valve 190 is located at the upper end, the water level stored in the humidifying water tank 130 may be formed lower than the lower end of the exhaust pipe 202.

Referring to FIG. 12, the floating valve 190 includes a valve body 192 formed of a material that floats on water, a valve stopper 196 that is disposed inside the valve body 192 and opens and closes the water supply hole 222*a* of the second connector 220 described below, and a stopper pillar 198 that is connected to the valve stopper 196 and extends downward.

The valve body 192 has a ring shape, and has a central hole 192*a* formed in the inside. The central hole 192*a* may have a shape that penetrates the center of the valve body 192. The diameter 192*a*D of the central hole 192*a* may be greater than or equal to the diameter 184*a*D of the communication hole 184*a*. Therefore, even if bubbles generated from water heated inside the outer wall 172 flows into the inner wall 178 through the communication hole 184*a*, they may flow to the inside of the central hole 192*a* to minimize the impact on the up-down movement of the floating valve 190.

A guide groove 192*b* corresponding to the inner rib 182 disposed on the inner circumferential surface of the inner wall 178 may be formed on the circumferential surface of the valve body 192. The guide groove 192*b* may be formed to extend in the up-down direction. A plurality of guide grooves 192*b* may be disposed to be spaced apart in the circumferential direction on the outer circumferential surface of the valve body 192.

A connecting rib 194 connected to the stopper pillar 198 is disposed on the inner circumferential surface of the valve body 192. The connecting rib 194 may have a structure that protrudes inward in a radial direction from the inner circumferential surface of the valve body 192 and is connected to the stopper pillar.

The valve stopper 196 may have a structure whose diameter decreases toward the upper side. The valve stopper 196 may have a sharp upper side. The valve stopper 196 may have a cylindrical shape with a sharp upper side. The upper end of the valve stopper 196 may be disposed higher than the upper end of the valve body 192.

First Connector>

Hereinafter, a first connector according to an embodiment of the present disclosure will be described with reference to FIGS. 13 to 16.

The first connector 200 is connected to the upper side of the humidifying water tank 130. The first connector 200 may supply humidified air generated in the humidifying water tank 130 to a first discharge passage 74 described below. The first connector 200 may communicate the inside of the humidifying water tank 130 and the first discharge passage 74.

The first connector 200 may supply air introduced from the heating water tank 170 to the first discharge passage 74. The first connector 200 may supply air introduced through the air supply pipe 140 to the first discharge passage 74.

The first connector 200 includes an exhaust pipe 202 that communicates the humidifying chamber 130*a* and the first discharge passage 74. The exhaust pipe 202 has a structure that extends vertically. The lower end of the exhaust pipe 202 is disposed inside the humidifying chamber 130*a*. The upper end of the exhaust pipe 202 is connected to the lower guide wall 78.

The exhaust pipe 202 may have an oval cross-sectional shape. The exhaust pipe 202 may have an oval pillar shape formed long in the direction in which the two ultrasonic oscillators 162*a* and 162*b* disposed on the lower surface of the humidifying water tank wall 132 are spaced apart. Therefore, humidified air generated by the ultrasonic oscillators 162*a* and 162*b* can easily flow into the lower hole 202*a* of the exhaust pipe 202.

A first groove 204*a*, which is recessed upward in the direction in which the air supply pipe 140 is disposed, is formed in the lower end of the exhaust pipe 202. A second groove 204*b*, which is recessed upward in the direction in which the heating water tank 170 is disposed, is formed in the lower end of the exhaust pipe 202.

The first groove 204*a* and the second groove 204*b* may allow the air discharged from the air supply pipe 140 to easily flow into the exhaust pipe 202. The first groove 204*a* and the second groove 204*b* may allow humidified air discharged from the heating water tank 170 to easily flow into the exhaust pipe 202.

The first groove 204*a* and the second groove 204*b* may allow air flowing from the air supply pipe 140 to flow into the exhaust pipe 202, even if the humidifying water tank 130 is filled with water at a certain level. The first groove 204*a* and the second groove 204*b* may allow air flowing from the air flow pipe 230 to flow into the exhaust pipe 202, even if the humidifying water tank 130 is filled with water at a certain level. The first groove 204*a* and the second groove 204*b* are disposed in opposite directions.

The lower hole 202*a* is formed in the lower end of the exhaust pipe 202, and the upper hole 202*b* is formed in the upper end. Accordingly, humidified air generated in the humidifying chamber 130*a* may flow into the lower hole 202*a* and flow into the upper hole 202*b*. In the case of humidified air, due to its rising nature, it may flow from the lower hole 202*a* to the upper hole 202*b* and flow into the first discharge passage 74. However, condensed water generated in the first discharge passage 74 may flow into the upper hole 202*b* of the exhaust pipe 202 and flow into the lower hole 202*a*. Accordingly, condensed water generated in the first discharge passage 74 may flow into the humidifying chamber 130*a*.

A middle hole 202*c* may be formed in the exhaust pipe 202, in one side facing a flow pipe outlet 234 of the air flow pipe 230 of the second connector 220 described below. The middle hole 202*c* is disposed between the lower hole 202*a* and the upper hole 202*b*. The middle hole 202*c* may be disposed in the area where the humidifying chamber 130*a* is formed. The middle hole 202*c* may be disposed to face the flow pipe outlet 234 of the air flow pipe 230. Accordingly, the air flowing in the heating water tank 170 through the air flow pipe 230 may flow into the exhaust pipe 202 through the middle hole 202*c*. Water vapor discharged from the heating chamber 170*a* through the air flow pipe 230 may flow to the exhaust pipe 202 through the middle hole 202*c* or the lower hole 202*a* and then flow into the first discharge passage 74.

The first connector 200 includes a first plate 206 disposed in the upper side of the upper plate 146 of the humidifying water tank 130. The first plate 206 is disposed in the upper side of the upper plate 146. The upper plate 146 extends in a direction perpendicular to the up-down direction in which the exhaust pipe 202 extends. The first plate 206 may be disposed to be seated on the upper side of the upper plate 146. With the first plate 206 seated on the upper plate 146, the first connector 200 may be fastened to the humidifying water tank 130.

The first connector 200 includes a first connecting plate 208 disposed in the upper side of the air supply pipe 140. The first connecting plate 208 may have a shape bent upward from the first plate 206. The first connecting plate 208 may have a shape corresponding to the upper side of the air supply pipe 140.

Accordingly, the air flowing through the air supply pipe 140 may flow into the inner space of the humidifying water tank wall 132 along the first connecting plate 208. However, the air supplied through the air supply pipe 140 may flow downward inside the humidifying water tank wall 132 through the exhaust pipe 202 and flow to the exhaust pipe 202. That is, the air supplied through the air supply pipe 140 may flow inside the humidifying water tank wall 132 and flow to the exhaust pipe 202 together with the humidified air generated inside the humidifying water tank 130. This may increase the amount of humidified air flowing through the exhaust pipe 202.

The first connector 200 includes a second connecting plate 210 disposed in the upper side of the air flow pipe 230 of the second connector 220 described below. The second connecting plate 210 may have a shape bent upward from the first plate 206. The second connecting plate 210 may have a shape corresponding to the upper surface of the air flow pipe 230.

Accordingly, the air flowing through the air flow pipe 230 may flow into the inner space of the humidifying water tank wall 132 along the second connecting plate 210. The air supplied through the air flow pipe 230 may flow into the middle hole 202*c* of the exhaust pipe 202. In addition, the air supplied through the air flow pipe 230 may flow inside the humidifying chamber 130*a* and flow into the lower hole 202*a* of the exhaust pipe 202.

The supply pipe outlet 144 of the air supply pipe 140 and the flow pipe outlet 234 of the air flow pipe 230 may be disposed in opposite directions with respect to the exhaust pipe 202.

The first connector 200 includes a lower protrusion 212 that protrudes downward from the first plate 206, and is mounted in the inside of the humidifying water tank wall 132. The lower protrusion 212 may have a structure that protrudes downward from the first plate 206. The lower protrusion 212 may be disposed in contact with the humidifying water tank wall 132 of the humidifying water tank 130. The lower protrusion 212 contacts the inside of the humidifying water tank wall 132, so that the disposition of the first connector 200 disposed in the upper side of the humidifying water tank 130 can be fixed.

The first connector 200 may include a blocking wall 214. The blocking wall 214 extends downward from the first plate 206. The blocking wall 214 may be disposed in the area where the water level sensor 160 is disposed. The blocking wall 214 has a bending structure, and has one end and the other end that are disposed in contact with the inside of the humidifying water tank wall 132.

The length 214L of the blocking wall 214 protruding downward from the first plate 206 may be longer than the length 202L of the exhaust pipe 202 protruding downward from the first plate 206. Accordingly, the blocking wall 214 may minimize changes in the water level vibrated by the ultrasonic vibrator 162*a*, 162*b* in the area where the water level sensor 160 is disposed.

Second Connector>

Figure 17:
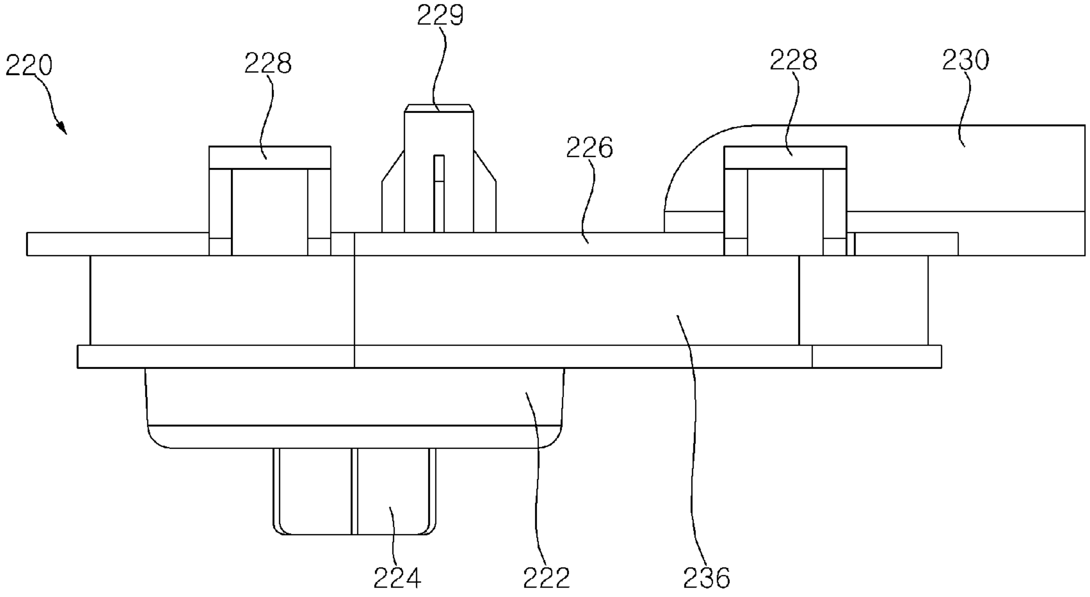
FIG. 17 is a side view of a second connector according to an embodiment of the present disclosure.
Figure 18:
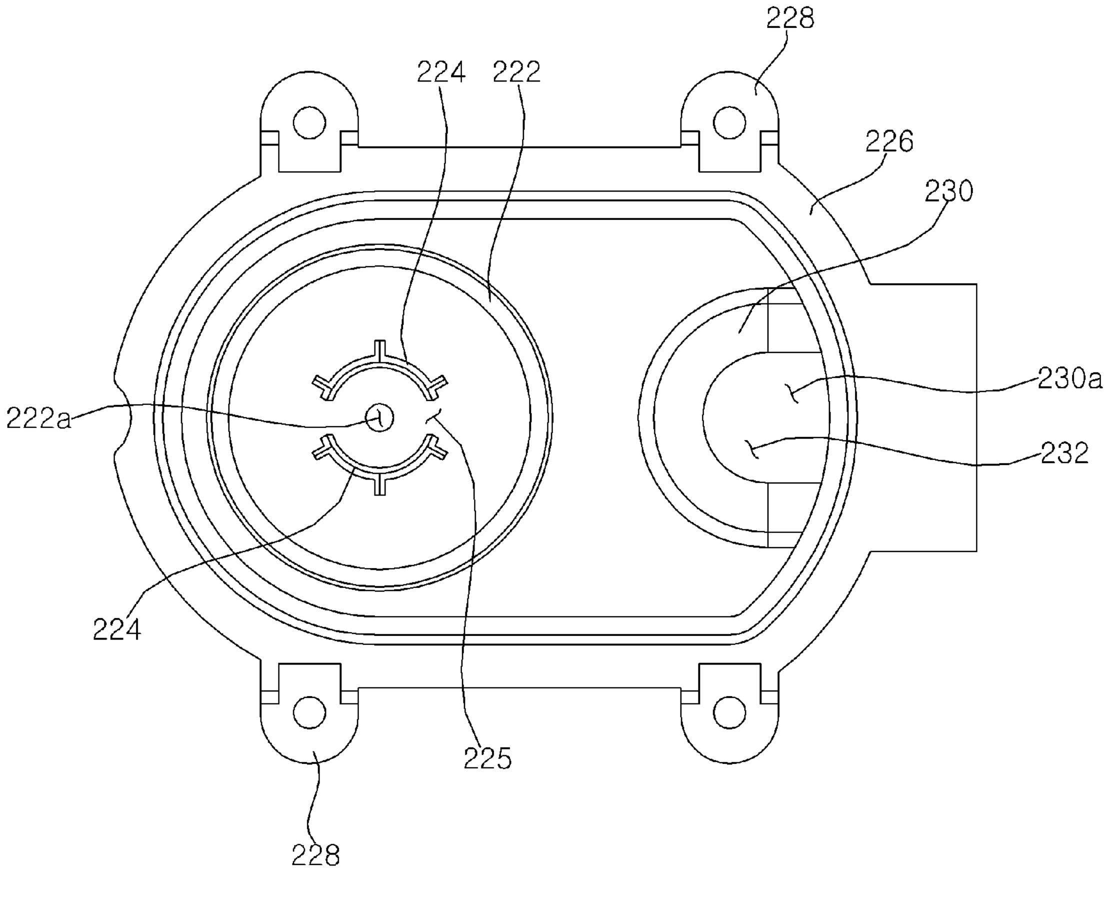
FIG. 18 is a bottom view of FIG. 17.
Figure 19:
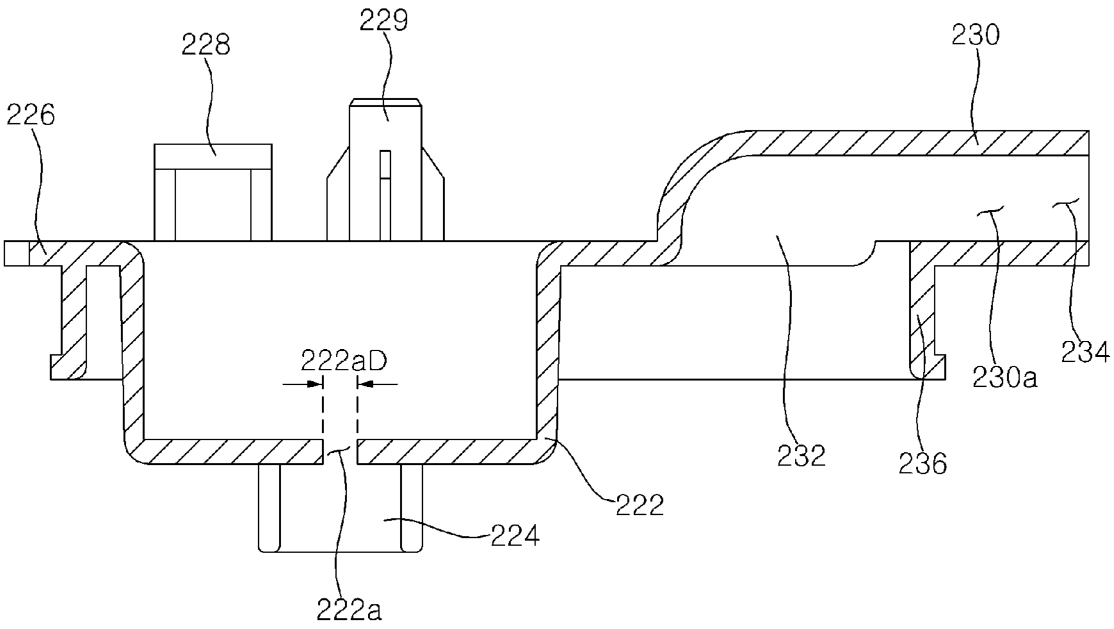
FIG. 19 is a cross-sectional view of one side of FIG. 17.

Hereinafter, a second connector according to an embodiment of the present disclosure will be described with reference to FIGS. 17 to 19.

The second connector 220 may cover the upper side of the heating water tank 170. The second connector 220 may supply water vapor generated in the heating water tank 170 into the humidifying water tank 130. The second connector 220 may supply water discharged from the water tank 110 to the heating water tank 170.

The second connector 220 has the water supply hole 222*a* through which water supplied from the water supply pipe 240 described below is supplied to the heating water tank 170. The water supply hole 222*a* is disposed in the upper side of the inner wall 178 of the heating water tank 170.

The second connector 220 includes a water supply tank 222 that temporarily stores water supplied from the water supply pipe 240 described below and supplies it to the heating water tank 170. The water supply tank 222 is disposed in the upper side of the inner wall 178. The water supply hole 222*a*, which supplies water supplied from the water supply pipe 240 into the inner wall 178, is formed in the water supply tank 222.

The second connector 220 includes a second plate 226 disposed in the upper side of the upper plate 146. The second plate 226 is disposed in the upper side of the upper plate 146 to seat the second connector 220 in the humidifying water tank 130. The second connector 220 may be fastened by a separate fastening means while the second plate 226 is mounted on the upper plate 146.

The water supply tank 222 may have a shape that is concave downward from the second plate 226. The water supply tank 222 may have a cylindrical shape that is recessed downward from the second plate 226. The diameter 222D of the internal space formed by the water supply tank 222 may be smaller than the diameter 178D of the internal space formed by the inner wall 178.

The lower end of the water supply tank 222 is disposed lower than the upper end of the inner wall 178.

The diameter 222*a*D formed by the water supply hole 222*a* may be smaller than the diameter 184*a*D of the communication hole 184*a* formed on the lower surface of the inner wall 178. The diameter 222*a*D formed by the water supply hole 222*a* may be smaller than the diameter 192*a*D of the central hole 192*a* formed in the floating valve 190. The water supply hole 222*a* may be disposed above the communication hole 184*a*. The water supply hole 222*a* may be formed above the central hole 192*a*. Therefore, the water flowing into the inner wall 178 through the water supply hole 222*a* may flow to the inner space of the outer wall 172 through the center hole 192*a* of the floating valve 190 and the communication hole 184*a* of the inner wall 178.

A guide protrusion 224 is formed on the lower surface of the water supply tank 222 to protrude downward. A pair of guide protrusions 224 in which semicircular structures are disposed spaced apart from each other may be disposed on the lower surface of the water supply tank 222. A pair of guide protrusions 224 are spaced apart from each other to form a gap 225. Water may be discharged through the gap formed between the pair of guide protrusions 224.

The valve stopper 196 of the floating valve 190 may be disposed inside the guide protrusion 224. The guide protrusion 224 can prevent the valve stopper 196 from vibrating in a direction perpendicular to the up-down direction when it moves up and down. The water supply hole 222*a* is formed inside the guide protrusion 224.

At least a portion of the guide protrusion 224 may be located in the central hole 192*a* formed inside the valve body 192.

The second connector 220 includes an air flow pipe 230 that sends water vapor generated inside the heating chamber 170*a* to the humidifying chamber 130*a*.

The air flow pipe 230 protrudes upward from the second plate 226, and has a structure extending in the direction in which the humidifying chamber 130*a* is disposed. The air flow pipe 230 includes a flow pipe inlet 232 (or "first end hole") through which air inside the heating chamber 170*a* flows, and a flow pipe outlet 234 (or "second end hole") through which air flows inside the air flow pipe 230 flows into the humidifying chamber 130*a*.

Figure 23:
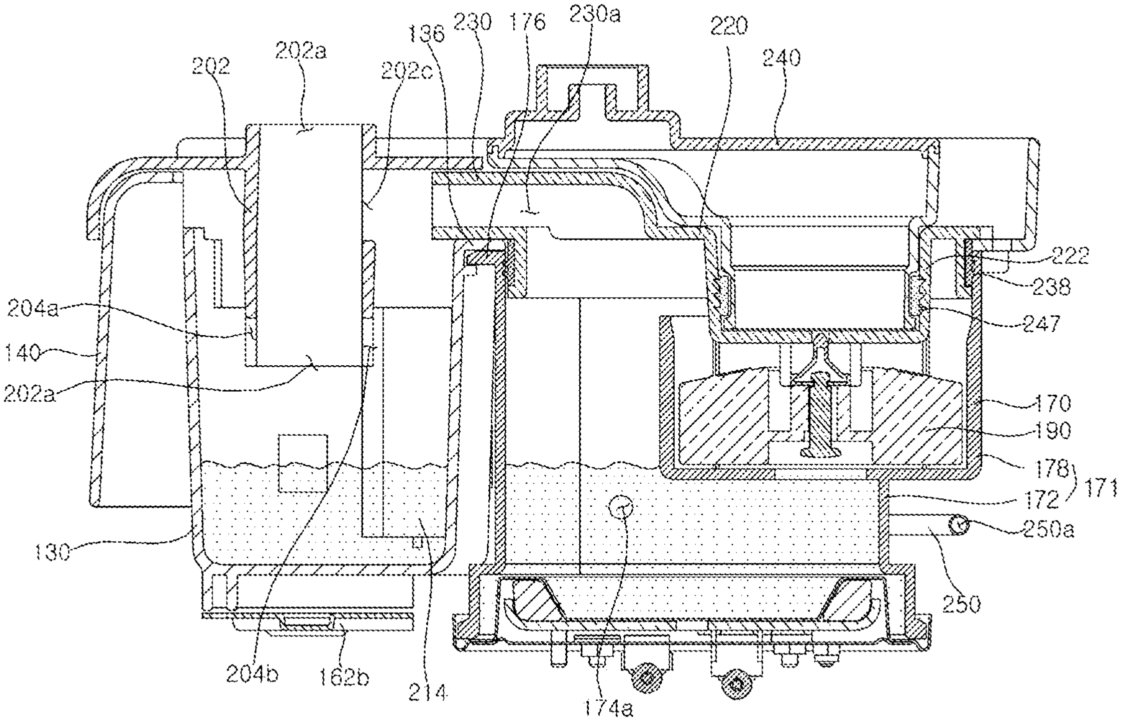
FIG. 23 is a cross-sectional view of one side of FIG. 22.

The flow pipe inlet 232 of the air flow pipe 230 is formed to be opened in the up-down direction. The flow pipe outlet 234 of the air flow pipe 230 is opened in a direction perpendicular to the flow pipe inlet 232. The flow pipe outlet 234 is opened toward the exhaust pipe 202 disposed inside the humidifying chamber 130*a*. Referring to FIG. 23, the flow pipe inlet 232 may be disposed not to overlap the inner wall 178 in the up-down direction. That is, the flow pipe inlet 232 may be disposed in the upper side of an area excluding an area where the inner wall 178 is disposed.

The second connector 220 includes a lower peripheral wall 236 that protrudes downward from the second plate 226. The lower peripheral wall 236 may be disposed in contact with the inner surface of the outer wall 172 of the heating water tank 170. In addition, a first sealer 238 may be disposed between the lower peripheral wall 236 and the outer wall 172 to prevent air or water vapor inside the heating chamber 170*a* from leaking to the outside.

A plurality of first coupling protrusions 228 coupled to the second fastening protrusions 154 of the upper plate 146 may be disposed in the second plate 226. A second coupling protrusion 229 coupled to the water supply pipe 240 may be disposed in the second plate 226.

Water Supply Pipe>

Figure 20:
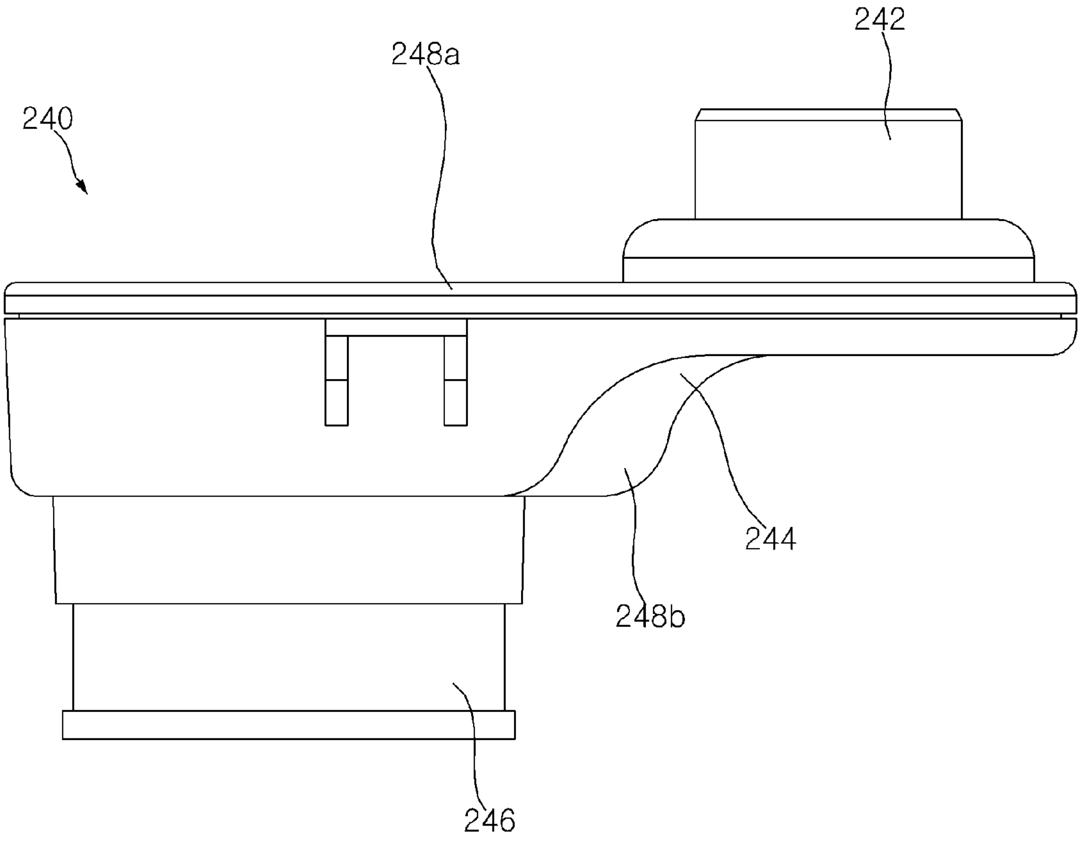
FIG. 20 is a side view of a water supply pipe according to an embodiment of the present disclosure.

Hereinafter, a water supply pipe according to an embodiment of the present disclosure will be described with reference to FIGS. 20 and 21.

The water supply pipe 240 may supply water stored in the water tank 110 to the heating water tank 170. The water supply pipe 240 is disposed in the lower side of the water tank 110. The water supply pipe 240 is disposed in the upper side of the heating water tank 170. The water supply pipe 240 may form a water supply passage 240*a* through which water flows by gravity. The water supply passage 240*a* may have a bent shape.

The water supply pipe 240 includes a water tank connector 242 that is coupled to the water tank 110. The water tank connector 242 may lift the cap 118 of the water tank 110, when the water tank 110 is disposed in the upper side of the water supply pipe 240. When the water tank 110 is mounted in the upper side of the water supply pipe 240, the water tank connector 242 lifts the cap 118 so that the water stored in the water tank 110 can flow into the water supply pipe 240.

The water supply pipe 240 includes a lower supply pipe 246 which is disposed to be spaced apart from the water tank connector 242 in the up-down direction and spaced apart from the water tank connector 242 in a direction perpendicular to the up-down direction, and an upper supply pipe 244 connecting the water tank connector 242 and the lower supply pipe 246.

The center of the water tank 110 and the center of the heating water tank 170 may be disposed to be spaced apart from each other. Accordingly, the upper and lower ends of the water supply pipe 240 are disposed to be spaced apart in a direction perpendicular to the up-down direction. Accordingly, the lower supply pipe 246 is disposed to be spaced apart from the water tank connector 242 in a direction perpendicular to the up-down direction.

The lower supply pipe 246 is disposed inside the water supply tank 222 of the second connector 220. The outer circumference of the lower supply pipe 246 may be disposed in contact with the inner circumference of the water supply tank 222. A second sealer 247 may be disposed between the lower supply pipe 246 and the water supply tank 222. The second sealer 247 may allow the water flowing into the water supply tank 222 to flow only into the heating water tank 170.

The upper supply pipe 244 may have a structure extending in a direction perpendicular to the up-down direction.

Figure 21:
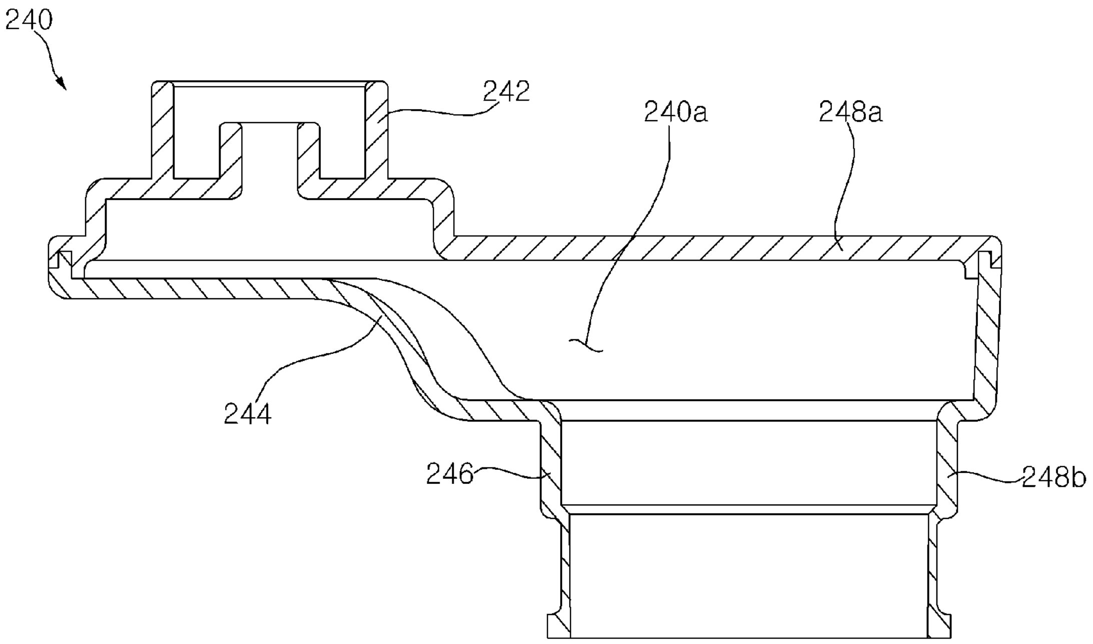
FIG. 21 is a cross-sectional view of one side of FIG. 20.

Referring to FIG. 21, the water supply pipe 240 may have a structure in which two components, i.e., an upper cover 248*a* and a lower cover 248*b*, are coupled. The water tank connector 242 is disposed in the upper cover 248*a*. The lower supply pipe 246 is disposed in the lower cover 248*b*. The upper supply pipe 244 may be disposed in the area where the upper cover 248*a* and the lower cover 248*b* are coupled. The upper cover 248*a* and the lower cover 248*b* may be coupled by fusion.

Connection Pipe and Water Tank Cover>

The connection pipe 250 connects the heating chamber 170*a* and the humidifying chamber 130*a*. The connection pipe 250 supplies water stored in the heating chamber 170*a* to the humidifying chamber 130*a*. The connection pipe 250 connects the water inlet pipe 134 of the heating chamber 170*a* and the water discharge pipe 174 of the humidifying chamber 130*a*. The connection pipe 250 may have a structure whose height is lowered as it progresses from the water inlet pipe 134 to the water discharge pipe 174.

In addition, the connection pipe 250 may have a structure whose height is maintained as it progresses from the water inlet pipe 134 to the water discharge pipe 174.

Figure 22:
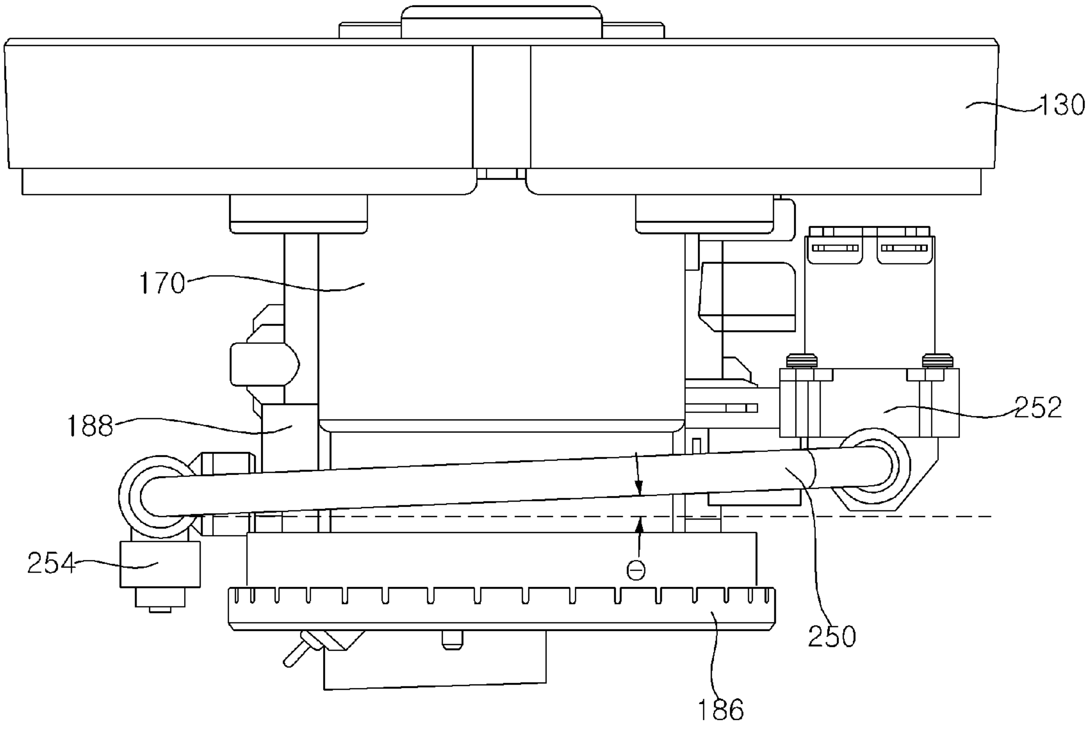
FIG. 22 is a front view of a humidifying water tank, a heating water tank, a first connector, a second connector, and a water supply pipe in combination, according to an embodiment of the present disclosure.

Referring to FIG. 22, the connection pipe 250 may form an inclination angle θ such that its height changes as it progresses from the water inlet pipe 134 to the water discharge pipe 174.

In one side of the connection pipe 250, a connection pipe valve 252 is disposed to open and close the first connection passage 250*a* formed inside the connection pipe 250. The connection pipe valve 252 may use a solenoid valve. The connection pipe valve 252 may open and close the inside of the connection pipe 250 according to an electrical signal. When the passage inside the connection pipe 250 is opened by the connection pipe valve 252, water inside the heating chamber 170*a* may flow to the humidifying chamber 130*a*. The connection pipe 250 is disposed to extend along the circumference of the heating water tank 170 while being spaced apart from the heating water tank 170.

The connection pipe valve 252 may open the passage inside the connection pipe 250, when the water temperature inside the heating water tank 170 detected by the temperature sensor 188 is a set temperature or higher.

The connection pipe valve 252 may be disposed closer to the water inlet pipe 134 than the water discharge pipe 174.

An ion sensor 254 may be disposed in one side of the connection pipe 250 to measure the amount of ions contained in the water supplied to the humidifying water tank 130.

Figure 25:
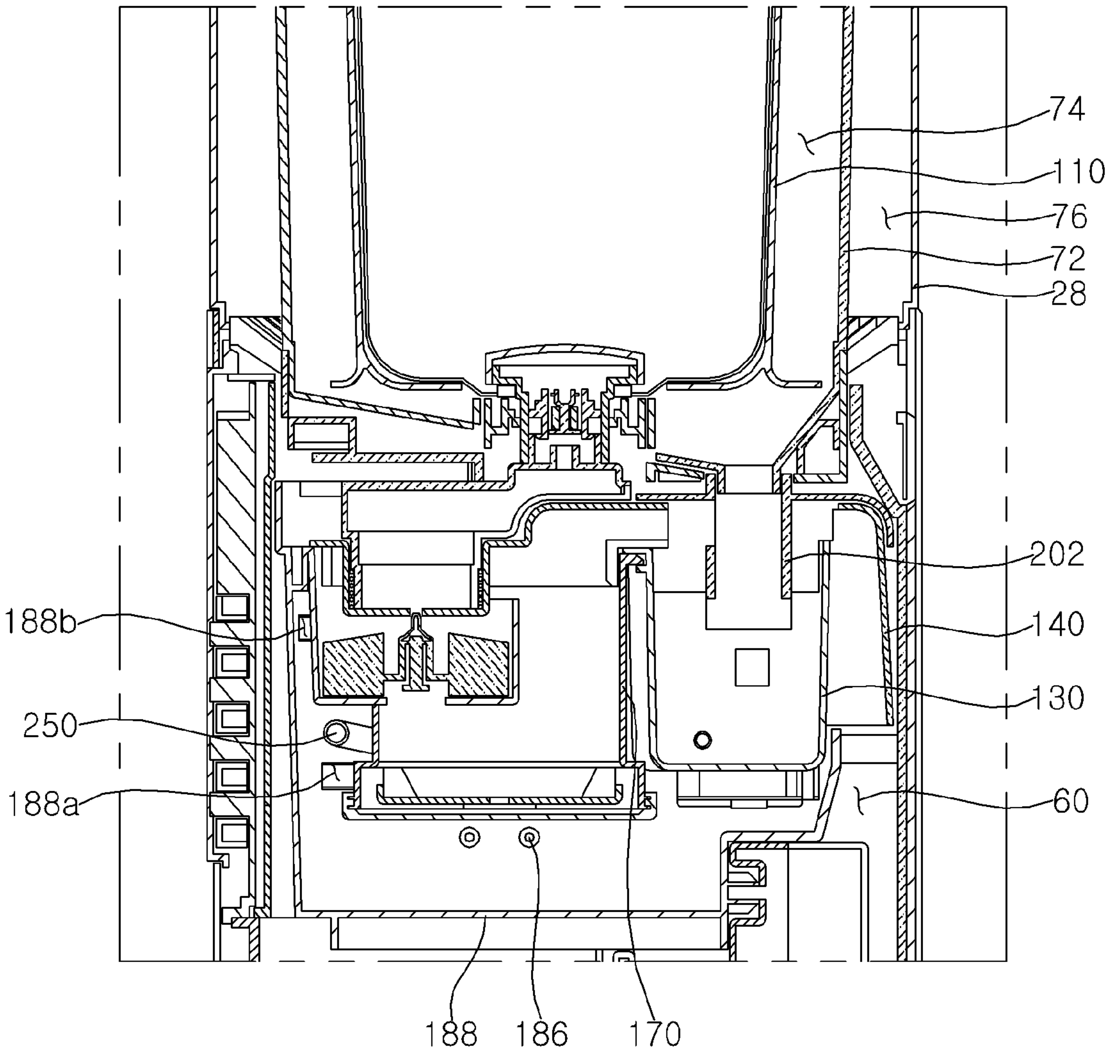
FIG. 25 is an enlarged view of a portion of FIG. 3.

The humidifier of the present disclosure includes a water tank cover 188 that forms a space in which the humidifying water tank 130 and the heating water tank 170 are disposed. The water tank cover 188 may cover the lower portion and perimeter of the humidifying water tank 130, the heating water tank 170, and the first connection pipe 250. The water tank cover 188 may be disposed inside the inlet cover 12 or the outer guider 28. Referring to FIG. 25, the water tank cover 188 is disposed inside the inlet cover 12. A blowing passage 60 of an air flowing upward by the blowing fan 52 may be formed between the inlet cover 12 and the water tank cover 188.

The humidifying water tank 130 and the heating water tank 170 may be disposed inside the water tank cover 188. The first connection pipe 250 connecting the humidifying water tank 130 and the heating water tank 170 may be disposed in the water tank cover 188. A heat exchange chamber 141 that cools the water flowing through the first connection pipe 250 may be formed inside the water tank cover 188. Here, the heat exchange chamber 141 may refer to a space where the first connection pipe 250 is disposed inside the water tank cover 188.

A water tank cover inlet 188*a* through which air flows into the water tank cover 188 may be formed in one side surface of the water tank cover 188. A water tank cover outlet 188*b* may be formed in the other side surface of the water tank cover 188. The water tank cover inlet 188*a* may be disposed lower than the water tank cover outlet 188*b*. The water tank cover inlet 188*a* may be disposed lower than the first connection pipe 250. The water tank cover outlet 188*b* may be disposed above the first connection pipe 250. The water tank cover inlet 188*a* may be disposed above the heater 186.

Therefore, a portion of the air flowing upward along the blowing passage 60 may flow to the inside of the water tank cover 188 through the water tank cover inlet 188*a*. In addition, air flowing from the inside of the water tank cover 188 to the blowing passage 60 through the water tank cover outlet 188*b* may flow upward. The water tank cover outlet 188*b* may be disposed lower than the supply pipe inlet 143 of the air supply pipe 140.

A plurality of water tank cover inlets 188*a* may be formed along the circumference of the water tank cover 188. The water tank cover inlet 188*a* may be formed on a surface facing the circumferential surface of the heating water tank 170 where the first connection pipe 250 is disposed.

Therefore, inside the water tank cover 188, a flow of air may be formed between the water tank cover inlet 188*a* and the water tank cover outlet 188*b*. The air flowing into the water tank cover inlet 188*a* may form an air flow in the area where the first connection pipe 250 is disposed. The air flowing into the water tank cover inlet 188*a* may cool the water flowing inside the first connection pipe 250. Accordingly, the water that is discharged from the heating water tank 170 and flows into the humidifying water tank 130 may be cooled while flowing through the first connection pipe 250. A guide wall 189 may be formed in the water tank cover 188 to guide the air flowing through the water tank cover inlet 188*a* to the area where the first connection pipe 250 is disposed.

Hereinafter, with reference to FIG. 25, the flow of water and humidified air that flow through the first discharge passage 74 from the water tank 110 via the heating water tank 170 or the humidifying water tank 130 will be described.

The heating water tank 170 forming the heating chamber 170*a* and the humidifying water tank 130 forming the humidifying chamber 130*a* are connected by two connection pipes 250 and 230.

Referring to FIG. 25, the heating water tank 170 and the humidifying water tank 130 are connected to each other by the first connection pipe 250 in a space where water is stored. The heating water tank 170 and the humidifying water tank 130 are connected to each other by a second connection pipe 230 at the upper side of the space where water is stored.

The first connection pipe 250 forms a first connection passage 250*a* through which water flows. The first connection pipe 250 is disposed in the lower side of the inner water tank wall 178 of the heating water tank 170. The first connection pipe 250 is disposed lower than the floating valve 190 of the heating water tank 170. The first connection pipe 250 is disposed at a position spaced lower than the lowest position of the floating valve 190.

The water inlet pipe 134 and the water discharge pipe 174 respectively connected to the first connection pipe 250 are disposed on the lower side of the inner water tank wall 178. The water inlet pipe 134 and the water discharge pipe 174 respectively connected to the first connection pipe 250 are disposed at a position spaced lower than the lowest position of the floating valve 190.

The second connection pipe 230 forms a second connection passage 230*a* through which air flows. Accordingly, the inner diameter of the second connection pipe 230 is formed to be larger than the inner diameter of the first connection pipe 250.

Figure 24:
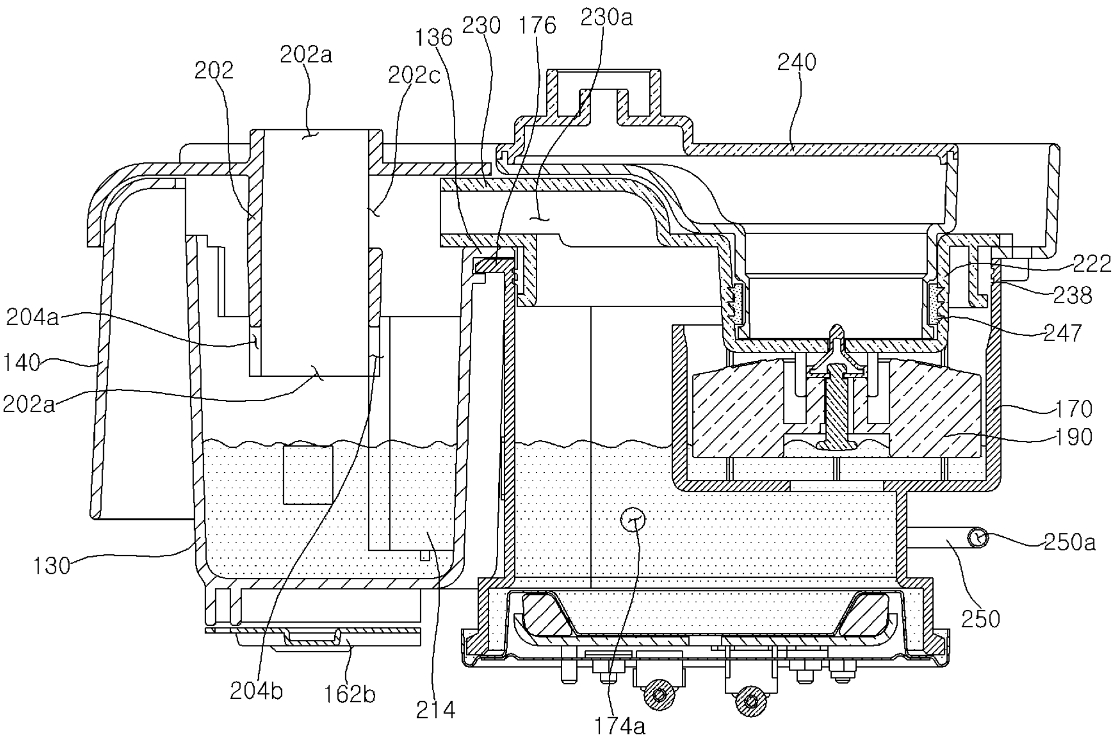
FIG. 24 is a view showing a high water level state of the humidifying water tank and the heating water tank in FIG. 23.

The second connection pipe 230 is disposed above the inner water tank wall 178. The second connection pipe 230 is disposed above the floating valve 190. As shown in FIG. 24, the second connection pipe 230 is spaced apart above the highest position of the floating valve 190.

The second connection pipe 230 has a first end hole 232 that communicates the inside of the heating water tank 170 and the second connection passage 230*a*, and a second end hole 234 communicates the inside of the humidifying water tank 130 and the second connection passage 230*a*. The first end hole 232 is open in the up-down direction. The second end hole 234 opens toward the exhaust pipe 202.

The second connection pipe 230 is disposed above the lower end of the exhaust pipe 202. The second connection pipe 230 may supply humidified air generated inside the heating chamber 170*a* to the humidification chamber 130*a*. The second connection pipe 230 may supply humidified air generated in the humidifying chamber 130*a* to the heating chamber 170*a*. The humidified air generated inside the heating chamber 170*a* or humidified air generated inside the humidifying chamber 130*a* may flow along the second connection pipe 230.

The exhaust pipe 202 is disposed in the humidifying water tank 130 to communicate the inside of the humidifying water tank 130 with the first discharge passage 74. The exhaust pipe 202 may send humidified air existing in the humidifying water tank 130 to the first discharge passage 74. The exhaust pipe 202 may flow condensed water generated in the first discharge passage 74 into the humidifying water tank 130.

The air supply pipe 140 is disposed in one side of the humidifying water tank 130. A portion of the air flowing by the blower 50 may flow through the air supply pipe 140. The air flowing through the air supply pipe 140 may flow into the exhaust pipe 202 through the humidification chamber 130*a*. The air flowing through the air supply pipe 140 can actively cause the air flow inside the humidification chamber 130*a*.

That is, the air flowing through the air supply pipe 140 can actively cause the humidified air existing in the humidifying chamber 130*a* to flow into the first discharge passage 74.

In the exhaust pipe 202, an upper hole 202*b* is formed above the humidifying water tank 130, and a lower hole 202*a* is formed inside the humidifying water tank 130. The lower hole 202*a* is formed at the lower end of the exhaust pipe 202. The upper hole 202*b* is formed at the upper end of the exhaust pipe 202.

The upper hole 202*b* and the lower hole 202*a* may be opened in the up-down direction. In the exhaust pipe 202, a middle hole 202*c* is formed between the upper hole 202*b* and the lower hole 202*a*. The middle hole 202*c* may be formed in a direction facing the second end hole 234 of the second connection pipe 230. Accordingly, humidified air that is discharged from the heating chamber 170*a* and flows through the second connection pipe 230 may flow into the exhaust pipe 202 through the middle hole 202*c*.

The water tank 110 is disposed above the heating water tank 170. The water tank 110 is disposed above the humidifying water tank 130. The water tank 110 forms the inner guider 72 and the first discharge passage 74. Accordingly, humidified air discharged through the exhaust pipe 202 may flow upward along the circumference of the water tank 110.

The water tank 110 may have a cylindrical shape. Accordingly, the air flowing through the first discharge passage 74 may flow along an annular passage.

The center C1 of the tank hole 116*a* through which water is discharged from the water tank 110 is disposed to be spaced apart from the center C2 of the water supply hole 222*a* through which water is supplied from the heating water tank 170. The center C1 of the tank hole 116*a* of the water tank 110 is spaced apart from the center C3 of the upper hole 202*b* of the exhaust pipe 202. The center C1 of the tank hole 116*a* of the water tank 110 may be disposed between the center C2 of the water supply hole 222*a* and the center C3 of the upper hole 202*b* of the exhaust pipe 202.

Second Embodiment

Hereinafter, with reference to FIGS. 26 to 31, the configuration and structure of a humidifier according to a second embodiment of the present disclosure will be described.

The humidifier of the present disclosure includes a water tank 110 for storing water, a heating water tank 170 that is disposed below the water tank 110 and heats the water supplied from the water tank 110, a humidifying water tank 130 that is disposed in one side of the heating water tank 170 and generates humidified air by using water supplied from the heating water tank 170, and a water tank exhaust pipe 135 that discharges the humidified air generated in the humidifying water tank 130 to the outside.

In addition, the humidifier of the present disclosure includes a first connection pipe 250 that connects the heating water tank 170 and the humidifying water tank 130. The humidifier includes a blowing fan 52 that rotates to supply air to the humidifying water tank 130, and a fan motor (not shown) that rotates the blowing fan 52. The humidifier includes an air supply pipe 140 that supplies air flowing by the blowing fan 52 to the humidifying water tank 130. A portion of the first connection pipe 250 is disposed inside the air supply pipe 140.

The humidifier may include a lower cover 187 that supports the disposition of the humidifying water tank 130 and the heating water tank 170 and forms a space located in a lower portion. An air supply pipe 140 may be disposed in a space formed by the lower cover 187. A communication hole 187*a* communicating with the outside may be formed in one side of the lower cover 187.

A heat dissipation fin 251 may be disposed around the first connection pipe 250 disposed inside the air supply pipe 140.

Figure 26:
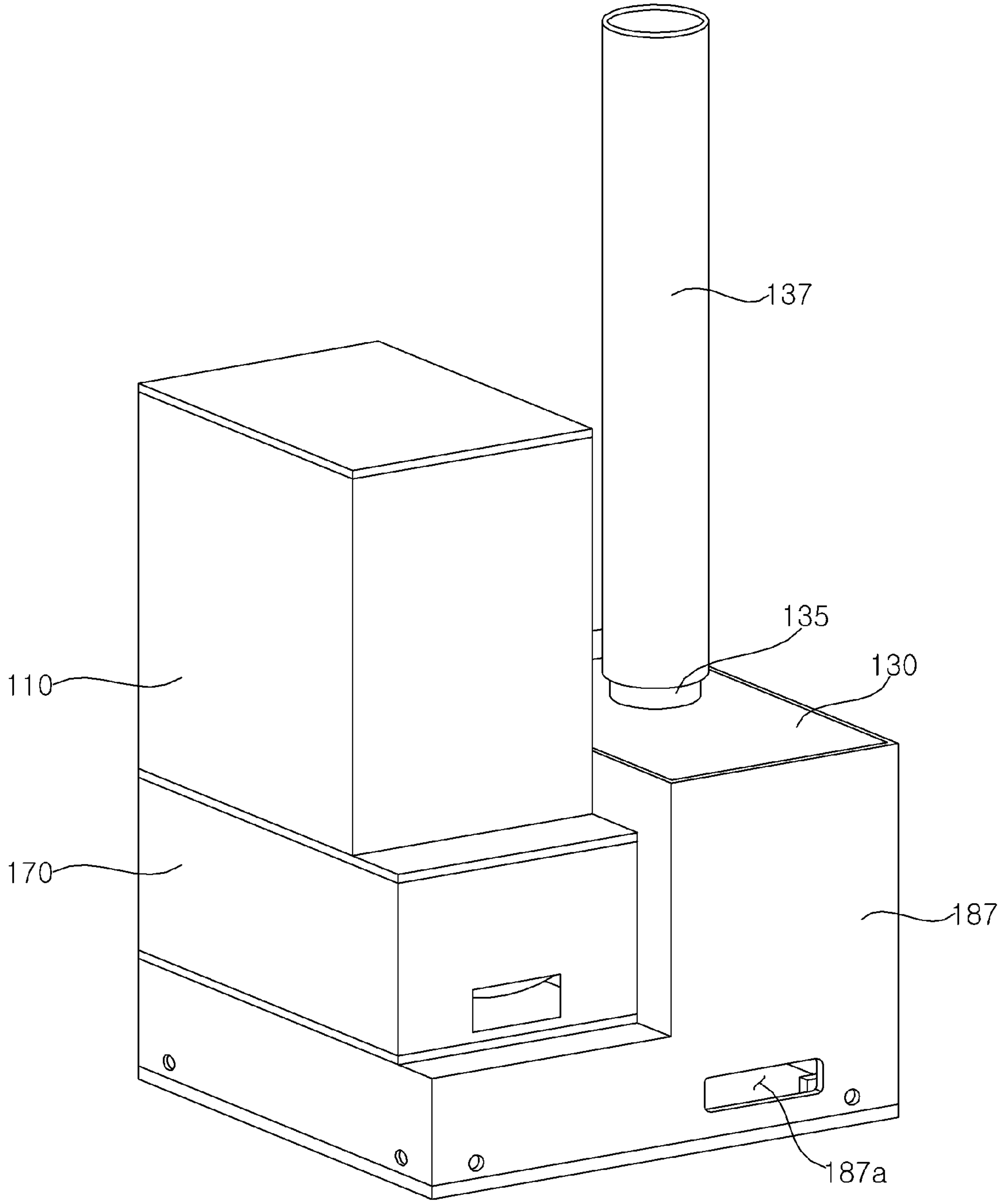
FIG. 26 is a perspective view of a humidifier according to a second embodiment of the present disclosure.
Figure 27:
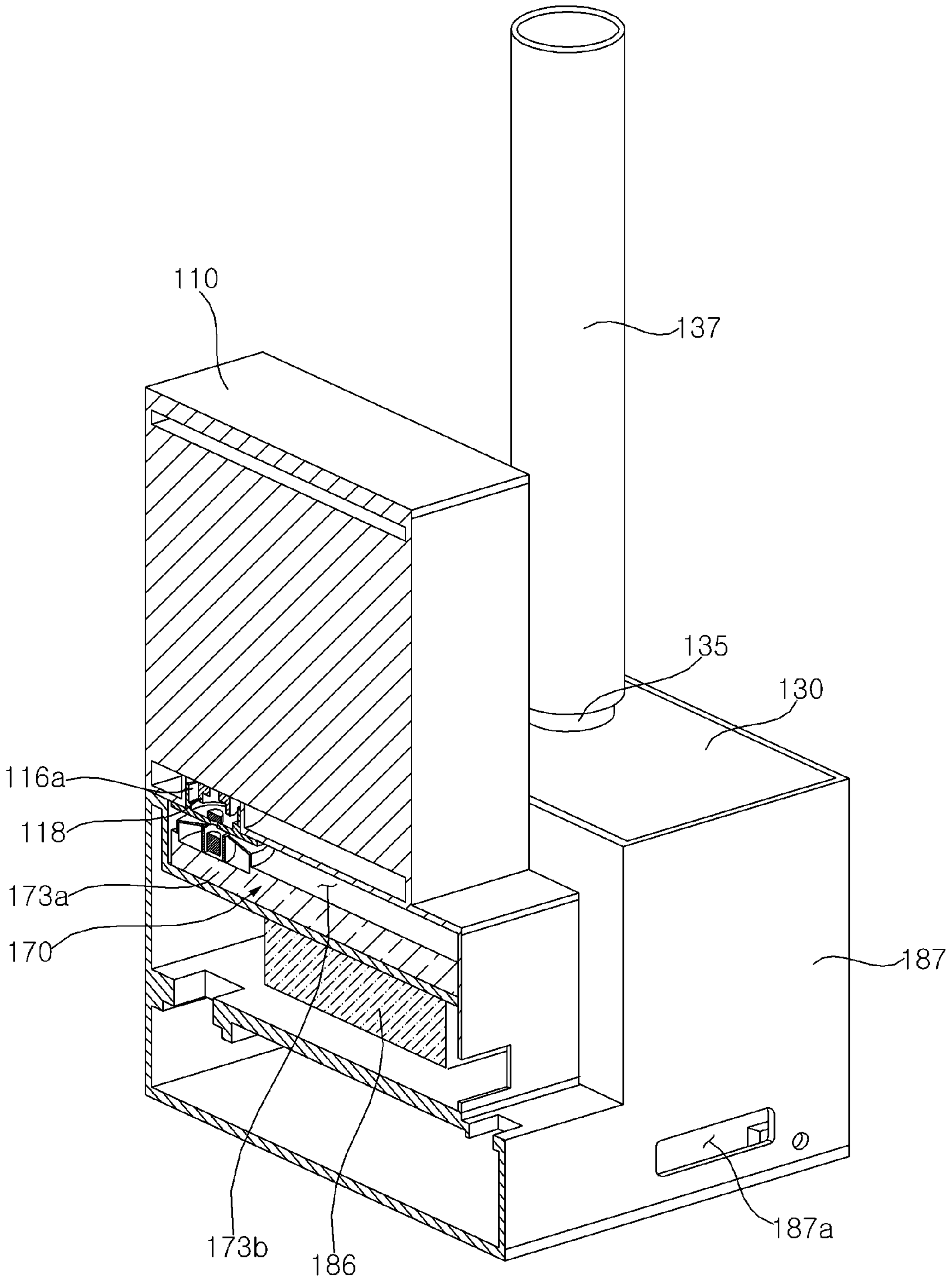
FIG. 27 is a cross-sectional perspective view of cut out of one side of FIG. 26.

Referring to FIGS. 26 to 27, the water tank 110 is disposed above the heating water tank 170. The water tank 110 is disposed above a water tank lower part 131*a* of the humidifying water tank 130, which will be described below, in the up-down direction.

Referring to FIG. 27, a tank hole 116*a* may be formed in the water tank 110 to supply water to the heating water tank 170. A cap 118 that opens and closes the tank hole 116*a* may be disposed in the water tank 110. When the water tank 110 is mounted in the heating water tank 170, the cap 118 may move upward to open the tank hole 116*a*.

A heater 186 that heats the heating water tank 170 is disposed below the heating water tank 170. The heating water tank 170 is connected to the first connection pipe 250 at one side of the lower part.

Figure 29:
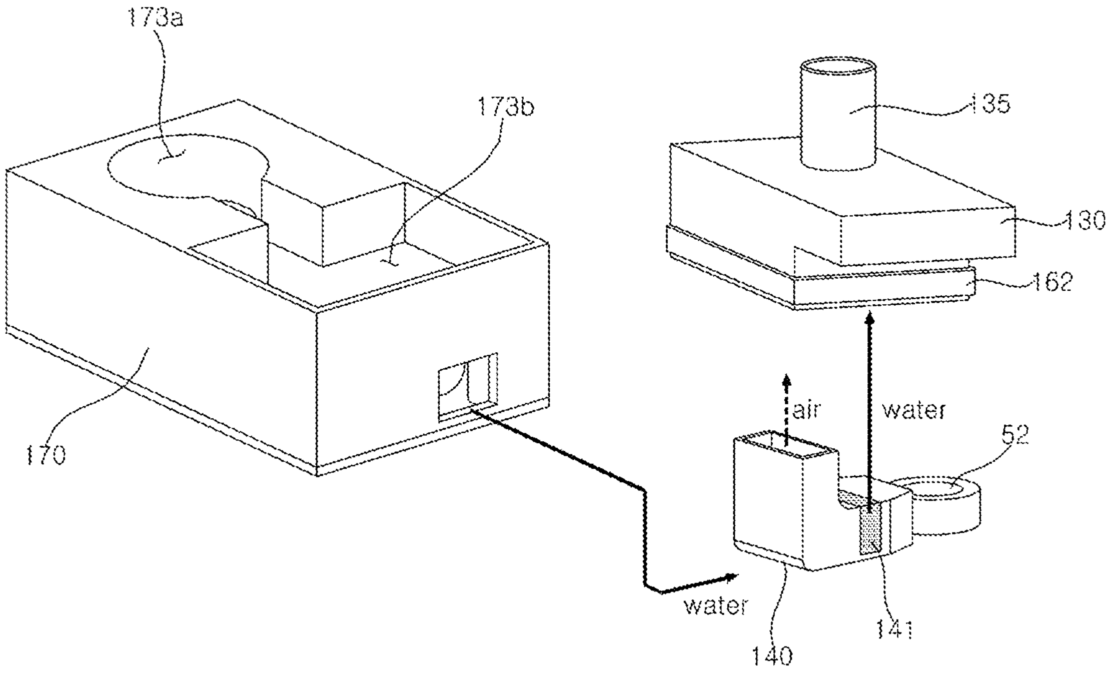
FIG. 29 is a diagram for explaining the flow of water in the humidifier according to the second embodiment of the present disclosure.
Figure 30:
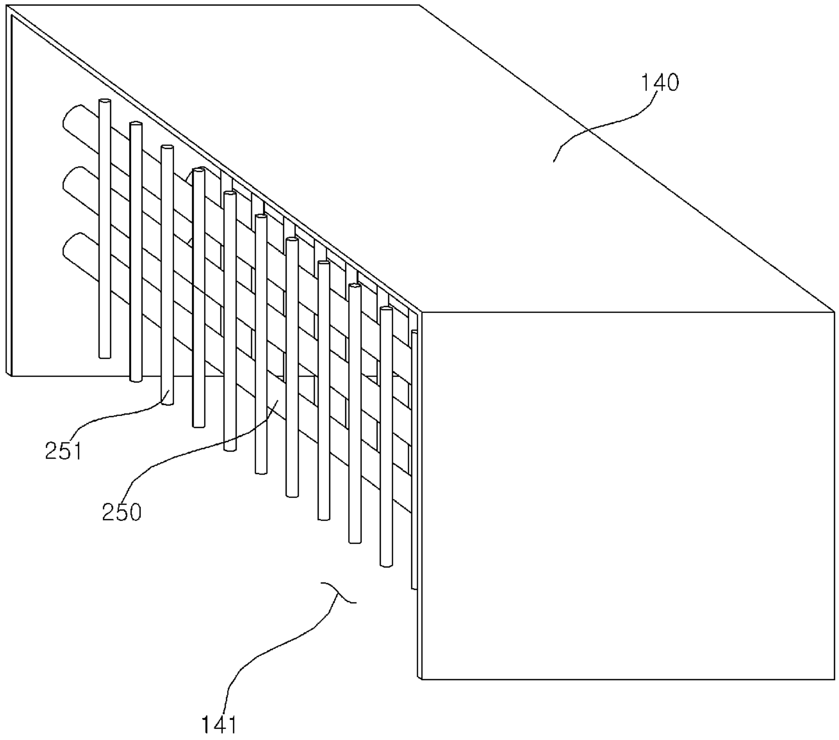
FIG. 30 is a view for explaining a heat exchange chamber of the humidifier according to the second embodiment of the present disclosure.

Referring to FIG. 29, the heating water tank 170 may include a supply chamber 173*a* that receives water from the water tank 110, and a heating chamber 173*b* that is disposed in one side of the supply chamber 173*a* and heats the water.

The humidifying water tank 130 is disposed in one side of the heating water tank 170. The humidifying water tank 130 may be disposed in a similar position in the up-down direction as the heating water tank 170. The humidifying water tank 130 may maintain the same water level as the heating water tank 170.

The humidifying water tank 130 may include a water tank lower part 131*a* that forms a space where water is stored, and a water tank upper part 131*b* that forms a space above the water tank lower part 131*a*.

The humidified air generated in the water tank lower part 131*a* may exist in the water tank upper part 131*b*.

An ultrasonic vibrator 162 that generates humidified air by ultrasonic vibration of water stored in the water tank lower part 131*a* may be disposed in the lower side of the water tank lower part 131*a*. The water tank upper part 131*b* may form a space expanded in a direction perpendicular to the up-down direction than the water tank lower part 131*a*. That is, referring to FIG. 28, the water tank upper part 131*b* may include a middle wall 133*a* extending in a direction perpendicular to the up-down direction from the upper end of the water tank lower part 131*a*.

Figure 28:
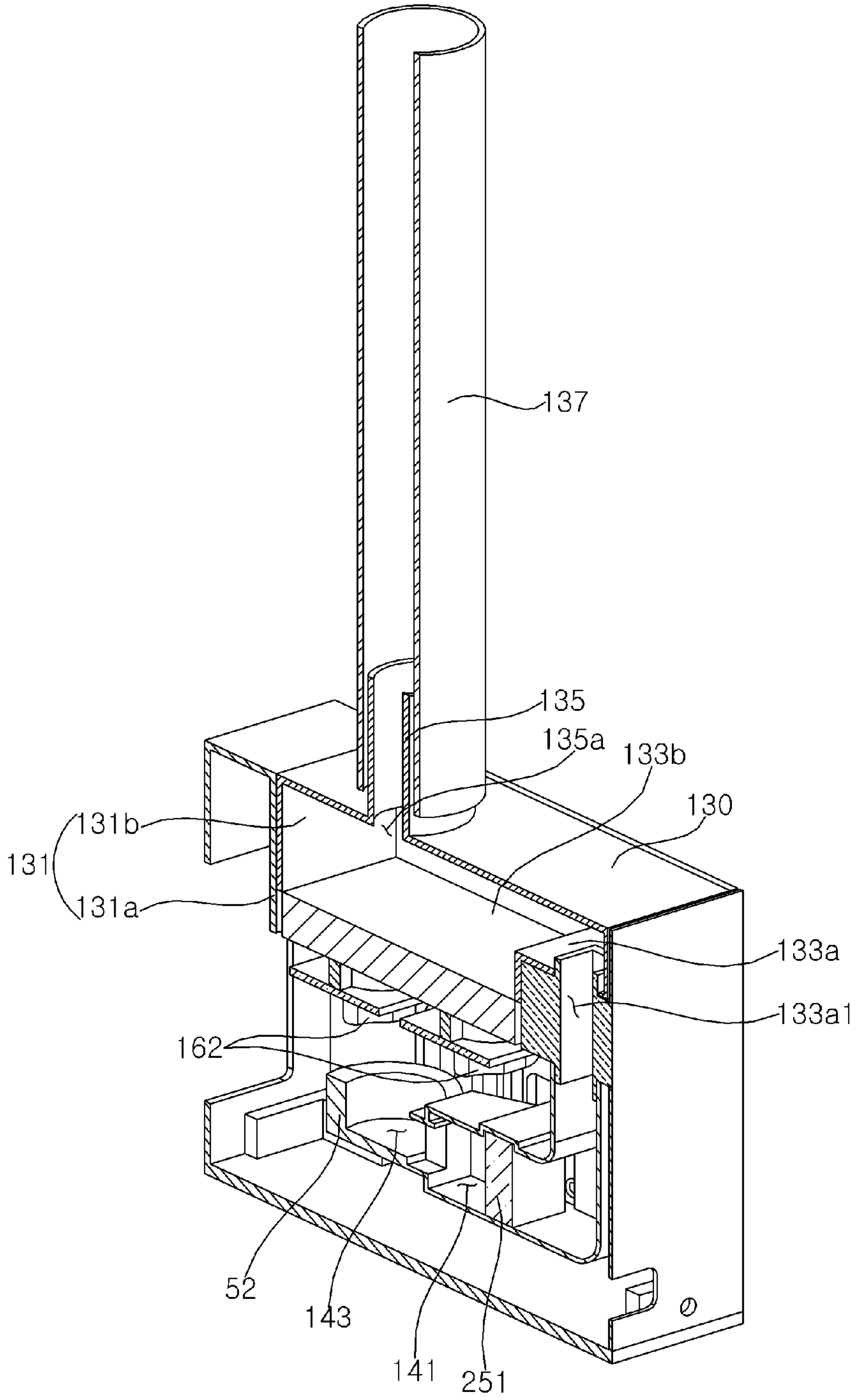
FIG. 28 is a cross-sectional perspective view of cut out of another side of FIG. 26.

An air supply hole 133*a*1 may be formed in the middle wall 133*a* to supply air into the humidifying water tank 130. Referring to FIG. 28, the air supply hole 133*a*1 may be opened in the up-down direction and may supply air flowing through the air supply pipe 140 to the humidifying water tank 130.

An exhaust hole 135*a* through which humidified air generated inside the humidifying water tank 130 is discharged is formed in a top wall 133*b* of the humidifying water tank 130. A water tank exhaust pipe 135 extending upward from the exhaust hole 135*a* may be disposed in the top wall 133*b* of the humidifying water tank 130. An extension pipe 137 may be disposed in the water tank exhaust pipe 135. The water tank exhaust pipe 135 may be disposed to be inserted into the lower part of the extension pipe 137.

The first connection pipe 250 may connect the heating water tank 170 and the humidifying water tank 130. That is, water heated by the heating water tank 170 may be supplied to the humidifying water tank 130 through the first connection pipe 250. Since the humidifying water tank 130 and the heating water tank 170 are disposed to form the same water level, water stored in the heating water tank 170 may flow into the humidifying water tank 130. However, unlike the drawing, it is also possible to have a separate pump (not shown) in the first connection pipe 250.

Since the ultrasonic vibrator 162 is vulnerable to high temperatures, reliability may be affected if it comes into direct contact with heated water. That is, when water heated in the heating water tank 170 for sterilization is directly supplied to the humidifying water tank 130, the operation of the ultrasonic vibrator 162 may be affected.

Accordingly, a portion of the first connection pipe 250 may be disposed to penetrate the inside of the air supply pipe 140. A heat exchange chamber 141 in which the first connection pipe 250 is disposed may be formed inside the air supply pipe 140. The first connection pipe 250 may form a plurality of bending passages inside the air supply pipe 140. A heat dissipation fin 251 may be disposed in the first connection pipe 250 disposed inside the air supply pipe 140.

The air supply pipe 140 may be disposed below the humidifying water tank 130. The air supply pipe 140 may be disposed inside the lower cover 187. A supply pipe inlet 143 through which air is sucked may be formed in one side of the air supply pipe 140. The supply pipe inlet 143 of the air supply pipe 140 communicates with the inner space of the lower cover 187. Therefore, the air inside the lower cover 187 of the air supply pipe 140 may be sucked in.

Unlike the drawing, the supply pipe inlet 143 of the air supply pipe 140 may be formed in one side of the lower cover 187. Therefore, it is also possible for the air supply pipe 140 to suck in external air from the lower cover 187.

A heat exchange chamber 141 may be formed inside the air supply pipe 140 to cool the first connection pipe 250. Here, the heat exchange chamber 141 may refer to a space, within the air supply pipe 140, in which the first connection pipe 250 and the heat dissipation fin 251 are disposed.

The heat exchange chamber 141 may cool the water supplied to the humidifying water tank 130. In addition, the heat exchange chamber 141 may heat the air supplied to the humidifying water tank 130. Since air heated through the heat exchange chamber 141 is supplied to the humidifying water tank 130, condensation of humidified air during the exhaust process can be minimized.

Figure 31:
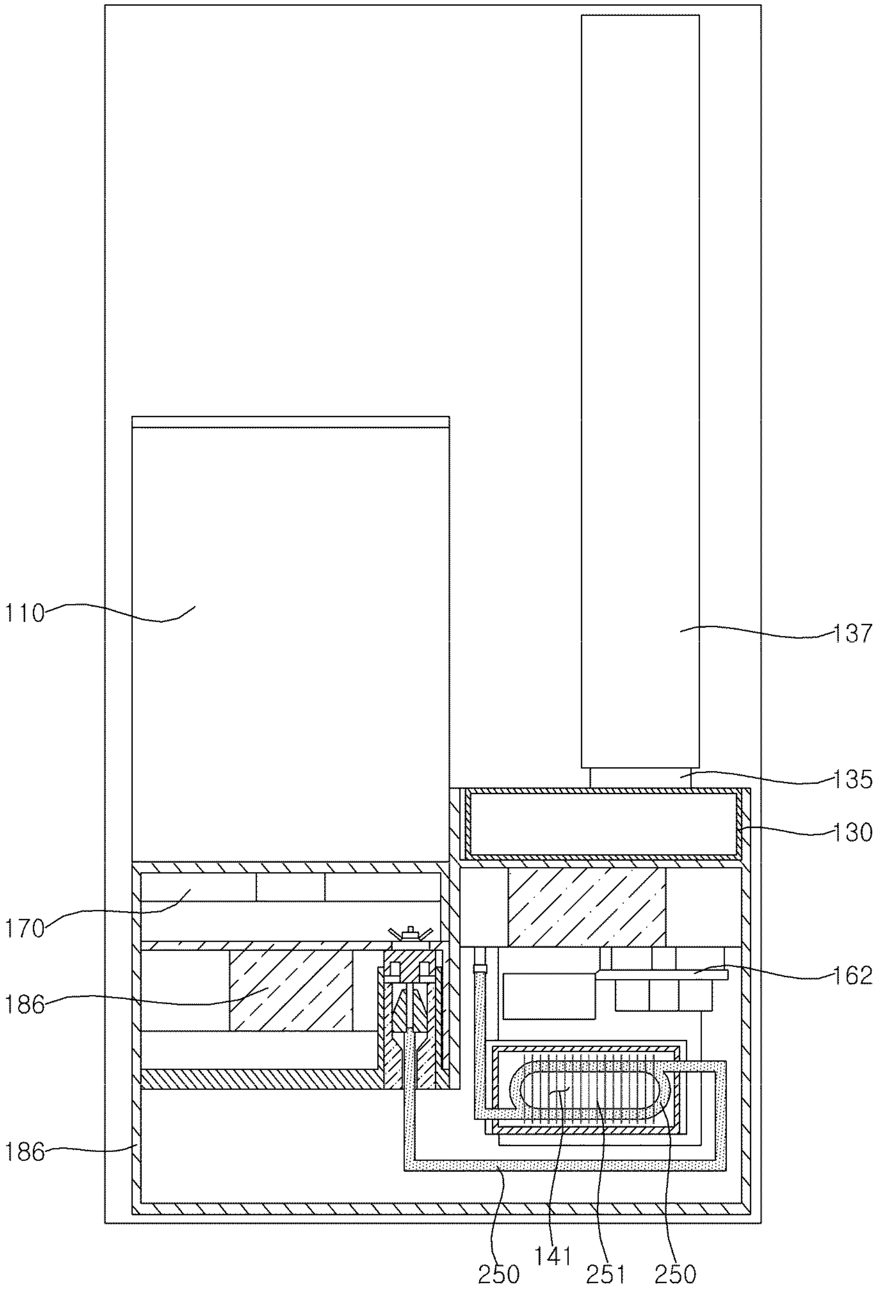
FIG. 31 is a cross-sectional view of one side for explaining the disposition of the humidifier according to the second embodiment of the present disclosure.

The flow of water and air according to the operation of the humidifier of the present disclosure will be described with reference to FIG. 31.

The water supplied to the water tank 110 may be supplied to the heating water tank 170 to be sterilized. Water heated in the heating water tank 170 may flow into the humidifying water tank 130. At this time, since the water discharged from the heating water tank 170 passes through the heat exchange chamber 141 of the air supply pipe 140, it can be cooled. The water cooled by the heat exchange chamber 141 may be supplied to the humidifying water tank 130 to generate humidified air. Since the water supplied to the humidifying water tank 130 is cooled through the heat exchange chamber 141, it may not affect the reliability of the ultrasonic vibrator 162.

In addition, the air flowing through the air supply pipe 140 flows into the humidifying water tank 130. The air flowing through the air supply pipe 140 is heated in the heat exchange chamber 141 and supplied to the humidifying water tank 130.

The air flowing into the humidifying water tank 130 through the air supply pipe 140 may flow to the water tank exhaust pipe 135 together with the humidified air generated in the humidifying water tank 130 and be discharged to the outside. The air supplied to the humidifying water tank 130 through the air supply pipe 140 can actively cause the flow of humidified air flowing into the exhaust hole 135*a*.

According to the humidifier of the present disclosure, one or more of the following effects are achieved.

First, the humidifier of the present disclosure can provide comfortable humidified air to indoor spaces by generating humidified air heated in the heating water tank.

Second, the water discharged from the heating water tank is cooled and supplied to the humidifying water tank, thereby improving the reliability of the ultrasonic oscillator disposed in the humidifying water tank.

Third, the air heated by heat exchange with the water flowing through the connection pipe is supplied to the humidifying water tank, thereby further atomizing the humidified air generated in the humidifying water tank.

Fifth, the humidified air generated in the humidifying water tank and the heating water tank are mixed and discharged together, thereby improving the humidifying performance of the humidifier.

The disclosure has been made in view of the above problems, and may provide a humidifier that supplies comfortable humidified air.

The disclosure may further provide a humidifier that sterilizes water in a heating water tank, cools the heat-sterilized water, and supplies it to a humidifying water tank.

The disclosure may further provide a humidifier that discharges both the humidified air generated in the heating water tank and the humidified air generated in the humidifying water tank.

The disclosure may further provide a humidifier that uses a water tank disposed above the humidifying water tank and the heating water tank as a guide for discharging the humidified air.

The disclosure may further provide a humidifier that exhausts the humidified air generated in a heating water tank or the humidified air generated in a humidifying water tank through the humidifying water tank, the heating water tank, or a connection pipe.

In accordance with an aspect of the present disclosure, a humidifier includes: a heating water tank which heats water; a humidifying water tank which is connected to the heating water tank, and generates humidified air by using water supplied from the heating water tank; a connection pipe which sends water stored in the heating water tank to the humidifying water tank; and a blowing fan which forms airflow around the connection pipe, so that water heated in the heating water tank may be cooled by air flowing through the blowing fan and supplied to the humidifying water tank.

At least a portion of the connection pipe is disposed in a heat exchange chamber, and air flowing by the blowing fan flows to the heat exchange chamber, so that the air flowing by the blowing fan can cool the water flowing through the connection pipe.

The air flowing by the blowing fan flows into the humidifying water tank, so that the air heat exchanged in the heat exchange chamber is supplied to the heating water tank to further atomize the humidified air.

An air supply pipe into which air is flowed by the blowing fan is disposed in one side of the humidifying water tank, and an exhaust pipe through which air inside the humidifying water tank is discharged is disposed in the other side of the humidifying water tank, so that the air supplied through the air supply pipe can activate the flow of humidified air discharged through the exhaust pipe.

The humidifier further includes a water tank cover in which a heat exchange chamber where the connection pipe is disposed is formed, and the heating water tank is disposed in the water tank cover.

The water tank cover is disposed above the blowing fan, and a cover inlet into which a portion of air flowing upward by the blowing fan flows is formed in the water tank cover, so that the air flowing into the cooling chamber through the cover inlet can cool the water flowing through the connection pipe.

A cover outlet through which air inside the heat exchange chamber is discharged is formed in the water tank cover, and the cover outlet is disposed above the cover inlet, so that air flowing into the cover inlet may flow upward and be discharged to the cover outlet.

The connection pipe is disposed between the cover inlet and the cover outlet in an up-down direction, so that air flowing upward from the inside of the water tank cover can pass through the connection pipe.

The connection pipe is connected to one side of the heating water tank and extends along a circumference of the heating water tank, and the cover inlet is disposed in a direction facing a circumferential surface of the heating water tank, so that airflow may form around the connection pipe.

A supply pipe inlet into which air flowing by the blowing fan is flowed is formed in the humidifying water tank, and the supply pipe inlet is disposed above the cover outlet, so that air discharged from the inside of the water tank cover may flow into the air supply pipe.

The humidifier further includes an air supply pipe which supplies air flowing by the blowing fan to the humidifying water tank, and a heat exchange chamber in which a portion of the connection pipe is disposed is formed inside the air supply pipe, so that the air flowing by the blowing fan can cool the water flowing through the connection pipe.

The blowing fan that forms air flow is disposed in one side of the air supply pipe, and the other side of the air supply pipe is connected to the inside of the humidifying water tank, so that the water flowing through the connection pipe and the heat-exchanged air can be supplied to the humidifying water tank.

The humidifying water tank includes a water tank lower part which forms a space where water is stored; and a water tank upper part which forms a space above the water tank lower part, wherein an air supply hole through which air flowing through the air supply pipe flows into the humidifying water tank is formed in one side of the water tank upper part, so that an air supply hole may be formed in the upper side of the space filled with water in the humidifying water tank.

An ultrasonic vibration which generates humidified air by using water stored inside the water tank lower part is disposed below the water tank lower part, and a discharge hole through which humidified air generated inside the humidifying water tank is discharged is formed above the water tank upper part, so that the air flowing into the air supply hole may flow inside the humidifying water tank and be discharged through the exhaust pipe.

The discharge hole is disposed above the ultrasonic vibrator, so that humidified air generated by the ultrasonic oscillator may mainly flow to the discharge hole.

The discharge hole is spaced apart from the air supply hole in a direction perpendicular to the up-down direction, so that the air flowing into the air supply hole may form a flow in the humidifying water tank and then flow to the discharge hole.

The water tank upper part comprises a middle wall extending in a direction perpendicular to an up-down direction from an upper end of the water tank lower part, and the supply pipe inlet is disposed in the middle wall.

In accordance with another aspect of the present disclosure, a humidifier includes: a cover having a suction port at one side and a discharge port above the suction port; a filter which is disposed inside the cover, and filters air flowing into the suction port; a water tank which is disposed inside the cover, and forms a space in which water is stored; a heating water tank which is disposed below the water tank, and heats water received from the water tank; a humidifying water tank which is disposed in one side of the heating water tank, and receives water from the heating water tank to generate humidified air; a water tank cover which is disposed spaced apart to the inside of the cover, and forms a space where the heating water tank and the humidifying water tank are disposed therein; a connection pipe which supplies water from the heating water tank to the humidifying water tank; and a blowing fan which is disposed below the water tank cover in the inside of the cover, and sends air flowing into the suction port to the discharge port, wherein a blowing passage through which air rising by the blowing fan flows is formed between the water tank cover and the cover, wherein a cover inlet into which a portion of air flowing in the blowing passage is flowed is formed in the water tank cover, so that a portion of the air rising by the blowing fan flows to the inside of the water tank cover to cool the water flowing through the connection pipe.

The humidifier further includes an inner guider disposed between the water tank and the cover, wherein a first discharge passage through which humidified air generated in the humidifying water tank flows is formed between the water tank and the inner guider, wherein a second discharge passage through which air flowing in the blowing passage flows is formed between the inner guider and the cover, so that a portion of the air flowing by the blowing fan may flow upward through the second discharge passage.

An air supply pipe, which supplies a portion of the air flowing in the blowing passage to the humidifying water tank, is disposed in one side of the humidifying water tank, so that a portion of the air flowing through the blowing passage may be supplied to the humidifying water tank.

In accordance with another aspect of the present disclosure, a humidifier includes: a water tank; a heating water tank which heats water supplied from the water tank; a humidifying water tank which generates humidified air by using water supplied from the heating water tank; a connection pipe connecting the heating water tank and the humidifying water tank; an air supply pipe which is connected to one side of the humidifying water tank, and supplies air to the humidifying water tank; and a blowing fan which is disposed in one side of the supply pipe, and forms an air flow inside the supply pipe, wherein a portion of the connection pipe is disposed to penetrate the inside of the supply pipe, so that the air supplied to the humidifying water tank by the blowing fan and the water supplied from the heating water tank to the humidifying water tank can exchange heat with each other and be supplied to the humidifying water tank.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical concept or scope of the present disclosure.

It will be understood that when an element or layer is referred to as being “on” another element or layer, the element or layer can be directly on another element or layer or intervening elements or layers. In contrast, when an element is referred to as being “directly on” another element or layer, there are no intervening elements or layers present. As used herein, the term “and/or” includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as “lower”, “upper” and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as “lower” relative to other elements or features would then be oriented “upper” relative to the other elements or features. Thus, the exemplary term “lower” can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to “one embodiment,” “an embodiment,” “example embodiment,” etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidifier, comprising:
- a heating water tank which heats water;
- a humidifying water tank which is connected to the heating water tank, and generates humidified air by using water supplied from the heating water tank;
- a connection pipe which sends water stored in the heating water tank to the humidifying water tank; and
- a blowing fan which forms airflow around the connection pipe,
- wherein the air flowing by the blowing fan flows into the humidifying water tank.

2. The humidifier of claim 1, further comprising a water tank cover in which a heat exchange chamber where the connection pipe is disposed is formed, wherein air flowing by the blowing fan flows to the heat exchange chamber.

3. The humidifier of claim 1, wherein an air supply pipe into which air is flowed by the blowing fan is disposed in one side of the humidifying water tank, wherein an exhaust pipe through which air inside the humidifying water tank is discharged is disposed in the other side of the humidifying water tank.

4. The humidifier of claim 1, further comprising a water tank cover in which a heat exchange chamber where the connection pipe is disposed is formed, wherein the heating water tank is disposed in the water tank cover.

5. The humidifier of claim 4, wherein the water tank cover is disposed above the blowing fan, wherein a cover inlet into which a portion of air flowing upward by the blowing fan flows is formed in the water tank cover.

6. The humidifier of claim 5, wherein a cover outlet through which air inside the heat exchange chamber is discharged is formed in the water tank cover, wherein the cover outlet is disposed above the cover inlet.

7. The humidifier of claim 6, wherein the connection pipe is disposed between the cover inlet and the cover outlet in an up-down direction.

8. The humidifier of claim 5, wherein the connection pipe is connected to one side of the heating water tank and extends along a circumference of the heating water tank, wherein the cover inlet is disposed in a direction facing a circumferential surface of the heating water tank.

9. The humidifier of claim 6, wherein a supply pipe inlet into which air flowing by the blowing fan is flowed is formed in the humidifying water tank, wherein the supply pipe inlet is disposed above the cover outlet.

10. The humidifier of claim 1, further comprising an air supply pipe which supplies air flowing by the blowing fan to the humidifying water tank, wherein a heat exchange chamber in which a portion of the connection pipe is disposed is formed inside the air supply pipe.

11. The humidifier of claim 1, wherein the blowing fan that forms air flow is disposed in one side of the air supply pipe, and the other side of the air supply pipe is connected to the inside of the humidifying water tank.

12. The humidifier of claim 11, wherein the humidifying water tank comprises:
- a water tank lower part which forms a space where water is stored; and
- a water tank upper part which forms a space above the water tank lower part, wherein an air supply hole through which air flowing through the air supply pipe flows into the humidifying water tank is formed in one side of the water tank upper part.

13. The humidifier of claim 12, wherein an ultrasonic vibration which generates humidified air by using water stored inside the water tank lower part is disposed below the water tank lower part, wherein a discharge hole through which humidified air generated inside the humidifying water tank is discharged is formed above the water tank upper part.

14. The humidifier of claim 13, wherein the discharge hole is spaced apart from the air supply hole in a direction perpendicular to the up-down direction.

15. The humidifier of claim 13, wherein the water tank upper part comprises a middle wall extending in a direction perpendicular to an up-down direction from an upper end of the water tank lower part, wherein the air supply hole is disposed in the middle wall.

16. A humidifier, comprising:
- a cover having a suction port at one side and a discharge port above the suction port;
- a filter which is disposed inside the cover, and filters air flowing into the suction port;
- a water tank which is disposed inside the cover, and forms a space in which water is stored;
- a heating water tank which is disposed below the water tank, and heats water received from the water tank;
- a humidifying water tank which is disposed in one side of the heating water tank, and receives water from the heating water tank to generate humidified air;
- a water tank cover which is disposed spaced apart to the inside of the cover, and forms a space where the heating water tank and the humidifying water tank are disposed therein;
- a connection pipe which supplies water from the heating water tank to the humidifying water tank; and
- a blowing fan which is disposed below the water tank cover in the inside of the cover, and sends air flowing into the suction port to the discharge port, wherein a blowing passage through which air rising by the blowing fan flows is formed between the water tank cover and the cover, wherein a cover inlet into which a portion of air flowing in the blowing passage is flowed is formed in the water tank cover.

17. The humidifier of claim 16, further comprising an inner guider disposed between the water tank and the cover, wherein a first discharge passage through which humidified air generated in the humidifying water tank flows is formed between the water tank and the inner guider, wherein a second discharge passage through which air flowing in the blowing passage flows is formed between the inner guider and the cover.

18. The humidifier of claim 17, wherein an air supply pipe, which supplies a portion of the air flowing in the blowing passage to the humidifying water tank, is disposed in one side of the humidifying water tank.

19. A humidifier, comprising:

a water tank;

a heating water tank which heats water supplied from the water tank;

a humidifying water tank which generates humidified air by using water supplied from the heating water tank;

a connection pipe connecting the heating water tank and the humidifying water tank;

an air supply pipe which is connected to one side of the humidifying water tank, and supplies air to the humidifying water tank; and a blowing fan which is disposed in one side of the supply pipe, and forms an air flow inside the supply pipe, wherein a portion of the connection pipe is disposed to penetrate the inside of the supply pipe.

* * * * *